(12) United States Patent
Lavian et al.

(10) Patent No.: US 8,879,703 B1
(45) Date of Patent: Nov. 4, 2014

(54) SYSTEM METHOD AND DEVICE FOR PROVIDING TAILORED SERVICES WHEN CALL IS ON-HOLD

(76) Inventors: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 276 days.

(21) Appl. No.: 13/484,277

(22) Filed: May 31, 2012

(51) Int. Cl.
*H04M 3/42* (2006.01)

(52) U.S. Cl.
USPC .................................. 379/201.01; 379/88.18

(58) Field of Classification Search
USPC ......................................... 379/201.01, 88.18
See application file for complete search history.

(56) References Cited

U.S. PATENT DOCUMENTS

| | | | |
|---|---|---|---|
| 4,586,035 A | 4/1986 | Baker et al. | |
| 5,210,789 A | 5/1993 | Jeffus et al. | |
| 5,737,393 A | 4/1998 | Wolf | |
| 5,771,276 A | 6/1998 | Wolf | |
| 5,802,526 A | 9/1998 | Fawcett et al. | |
| 5,850,429 A | 12/1998 | Joyce et al. | |
| 5,946,378 A * | 8/1999 | Farfan | 379/88.23 |
| 6,225,540 B1 | 5/2001 | Arias Fernandez et al. | |
| 6,351,599 B1 | 2/2002 | Komeno | |
| 6,400,804 B1 * | 6/2002 | Bilder | 379/76 |
| 6,429,813 B2 | 8/2002 | Feigen | |
| 6,836,768 B1 | 12/2004 | Hirsch | |
| 6,903,723 B1 | 6/2005 | Forest | |
| 6,920,425 B1 | 7/2005 | Will et al. | |
| 6,924,828 B1 | 8/2005 | Hirsch | |
| 6,993,362 B1 | 1/2006 | Aberg | |
| 7,027,571 B1 | 4/2006 | Cook | |
| 7,027,990 B2 | 4/2006 | Sussman | |
| 7,035,388 B2 | 4/2006 | Kurosaki | |
| 7,065,188 B1 | 6/2006 | Mei et al. | |
| 7,092,738 B2 | 8/2006 | Creamer et al. | |
| 7,113,200 B2 | 9/2006 | Eshkoli | |
| 7,136,478 B1 | 11/2006 | Brand et al. | |
| 7,142,661 B2 | 11/2006 | Erhart et al. | |
| 7,215,743 B2 | 5/2007 | Creamer et al. | |
| 7,366,499 B1 | 4/2008 | Michaelis | |
| 7,509,266 B2 | 3/2009 | Rogers et al. | |
| 7,512,098 B2 | 3/2009 | Jiang et al. | |
| 7,577,664 B2 | 8/2009 | Malik | |

(Continued)

FOREIGN PATENT DOCUMENTS

| EP | 195786 A1 | 10/1985 |
|---|---|---|
| EP | 1001597 A2 | 5/2000 |

(Continued)

OTHER PUBLICATIONS

CIO Leadership Briefing, "Deploying Visual IVR to Drive a Superior Customer Experience," A Q&A with Keith Ward, Chief Technology Officer.

*Primary Examiner* — Quynh Nguyen

(57) ABSTRACT

Embodiments of the present invention enable a telephone calling device to monitor information exchanged between the device and a destination after establishing a telephone call with the destination. The device may also be configured to create and store a profile of the user having stored therein data corresponding to personal information of the user and interaction of the user with various destinations. Further, the device may be configured to detect if the telephone call is on-hold or not by monitoring occurrence of a designated tone, background music, or pre-set amount of no-conversation between the user and the connected destination. Furthermore, based on the profile of the user, the device may display various services tailored specifically for the user when the call is on-hold.

20 Claims, 17 Drawing Sheets

(56) References Cited

U.S. PATENT DOCUMENTS

| | | |
|---|---|---|
| 7,590,943 B2 | 9/2009 | Bailey et al. |
| 7,602,888 B2 | 10/2009 | Vu |
| 7,603,627 B2 | 10/2009 | Bailey et al. |
| 7,657,005 B2 | 2/2010 | Chang |
| 7,717,712 B2 | 5/2010 | Brun et al. |
| 7,752,560 B2 | 7/2010 | Bailey et al. |
| 7,881,703 B2 | 2/2011 | Roundtree et al. |
| 7,882,115 B2 | 2/2011 | Hirsch |
| 8,000,454 B1 | 8/2011 | Or-Bach et al. |
| 8,054,952 B1 | 11/2011 | Or-Bach et al. |
| 8,150,699 B2 | 4/2012 | Patch |
| 8,155,280 B1 | 4/2012 | Or-Bach et al. |
| 8,160,215 B2 | 4/2012 | Or-Bach et al. |
| 8,175,651 B2 | 5/2012 | Rios et al. |
| 8,223,929 B2 | 7/2012 | Sylvain |
| 8,223,931 B1 | 7/2012 | Lavian et al. |
| 8,265,234 B2 | 9/2012 | Singh |
| 2002/0023230 A1 | 2/2002 | Bolnick et al. |
| 2002/0120932 A1 | 8/2002 | Schwalb |
| 2002/0194264 A1 | 12/2002 | Uchiyama et al. |
| 2003/0005076 A1 | 1/2003 | Koch et al. |
| 2003/0103075 A1 | 6/2003 | Rosselot |
| 2003/0179231 A1 | 9/2003 | Kamiwada et al. |
| 2004/0122941 A1 | 6/2004 | Creamer et al. |
| 2004/0236620 A1 | 11/2004 | Chauhan et al. |
| 2005/0231520 A1 | 10/2005 | Forest |
| 2005/0288973 A1 | 12/2005 | Taylor et al. |
| 2006/0200569 A1 | 9/2006 | Koch et al. |
| 2007/0043687 A1 | 2/2007 | Bodart et al. |
| 2007/0135101 A1 | 6/2007 | Ramati et al. |
| 2007/0286162 A1 | 12/2007 | Fabbrizio et al. |
| 2008/0030463 A1 | 2/2008 | Forest |
| 2008/0039056 A1 | 2/2008 | Mathews et al. |
| 2008/0066015 A1 | 3/2008 | Blankenhorn |
| 2008/0095330 A1 | 4/2008 | Jin et al. |
| 2008/0162628 A1 | 7/2008 | Hill et al. |
| 2008/0169944 A1 | 7/2008 | Howarth et al. |
| 2008/0304639 A1 | 12/2008 | McDonough et al. |
| 2009/0196405 A1 | 8/2009 | Romeo |
| 2009/0207980 A1 | 8/2009 | Berger et al. |
| 2009/0276441 A1 | 11/2009 | Malik |
| 2010/0011315 A1 | 1/2010 | Araki |
| 2010/0166158 A1 | 7/2010 | Costello et al. |
| 2010/0168996 A1 | 7/2010 | Bourque et al. |
| 2010/0169098 A1 | 7/2010 | Patch |
| 2010/0238115 A1 | 9/2010 | Komaarashi et al. |
| 2011/0009096 A1 | 1/2011 | Rotsztein et al. |
| 2011/0014952 A1 | 1/2011 | Minton |
| 2011/0125911 A1 | 5/2011 | Koch et al. |
| 2011/0225330 A1 | 9/2011 | Lavian et al. |
| 2011/0301943 A1 | 12/2011 | Patch |
| 2012/0056752 A1 | 3/2012 | Baldwin et al. |
| 2012/0095810 A1 | 4/2012 | Miao et al. |
| 2012/0110490 A1 | 5/2012 | Keller et al. |
| 2012/0136783 A1 | 5/2012 | Pousti |

FOREIGN PATENT DOCUMENTS

| | | |
|---|---|---|
| EP | 1003153 A1 | 5/2000 |
| EP | 1610536 A1 | 12/2005 |
| EP | 825770 B1 | 4/2008 |
| EP | 2039137 A2 | 3/2009 |
| EP | 2230582 A2 | 9/2010 |
| GB | 2331170 A | 5/1999 |
| GB | 2332972 A | 7/1999 |
| WO | 9630822 A1 | 10/1996 |
| WO | 9943159 A1 | 8/1999 |
| WO | 9943160 A1 | 8/1999 |
| WO | 0065483 A2 | 11/2000 |
| WO | 0211072 A1 | 2/2002 |
| WO | 2004055647 A2 | 7/2004 |
| WO | 2004104891 A1 | 12/2004 |
| WO | 2006123910 A1 | 11/2006 |
| WO | 2006125257 A1 | 11/2006 |
| WO | 2007024704 A2 | 3/2007 |
| WO | 2008002705 A2 | 1/2008 |
| WO | 2008144557 A1 | 11/2008 |
| WO | 2008144638 A2 | 11/2008 |
| WO | 2009079252 A1 | 6/2009 |
| WO | 2009100477 A1 | 8/2009 |
| WO | 2010076327 A1 | 7/2010 |
| WO | 2011007262 A1 | 1/2011 |
| WO | 2011046693 A1 | 4/2011 |
| WO | 2012010217 A1 | 1/2012 |
| WO | 2012026744 A2 | 3/2012 |

* cited by examiner

SYSTEM METHOD AND DEVICE FOR PROVIDING TAILORED SERVICES WHEN CALL IS ON-HOLD

FIELD OF THE INVENTION

The invention relates to Interactive Voice Response (IVR) system and more specifically the invention relates to the provision of tailored services to a user corresponding to a selected IVR option from a user device.

BACKGROUND OF THE INVENTION

Interactive Voice Response (IVR) technology is generally used to detect voice and key inputs from a user. Various organizations such as banks, insurance companies, and other service providers use IVR technology to manage calls from their customers. Typically, IVR systems are mainly used by organizations that have high call volumes.

Generally, when the user calls a destination, such as a bank, an automated audio menu is played. The audio IVR menu may provide options to the user to connect to a particular department of the destination to receive services, such as account balance inquiry, therefrom. Typically, each destination may have different departments and various services corresponding to each department. The IVR menu may provide more than one options to the users to select a particular department to enquire about or gain various services corresponding thereto. For example, an IVR menu of a bank may include options related to services corresponding to account department, loan department, credit card department, customer care etc. for example, the user may choose an option corresponding to loan department of a bank.

Further, if a customer calls an organization for receiving information, the IVR system of the organization places the call of the customer (caller) on hold for some purpose. The hold duration of the call may vary from one minute to one hour or even more. Thus the customer is forced to wait for response from the IVR system till the call is on hold. This leads to unnecessary time consumption (on the customer's part) that usually annoys the customer and may also encourage the customer to disconnect the call. Sometimes, IVR systems play soothing music during the hold duration of the call to entertain the caller. However, not every caller enjoys the music. Therefore, even the music playing during the hold duration of a call may become annoying for few callers.

Further, some organizations provide advertisements to the caller during the hold duration of a call. Generally, the advertisements are audio advertisements that can be played for the caller by the IVR system. However, the audio advertisements can be more annoying for the callers as the advertisements selected by the IVR systems are general and not intended to be of interest to the caller. Therefore, the advertisements may become even more annoying for the caller.

Furthermore, the duration for which a caller holds a call to receive a response from the dialed destination is typically unknown to the caller. Therefore, the caller is uncertain of the duration for which he/she is required to hold the call. Generally, the callers wait for a certain number of minutes and then disconnect the call if they don't receive a response. Moreover, in some cases, the callers may be impatient and may prefer to work on other things during the hold time. However, in such cases, the callers need to pay some attention to the status of the call, which again might be annoying to the users. The aforementioned limitations of the IVR system may influence the users to minimize the use of IVR technology.

Therefore, there is a need for improvement in the IVR technology to make the hold duration in the IVR calls more interesting, more interactive and more informational to the caller. Further, there is a need of a system that can allow the caller to focus on other work while the IVR call is on-hold.

SUMMARY

In an embodiment, the present invention provides a telephone calling device comprising a processor, memory, connection to the device keying information, connection to display, connection to the Internet and connection to the device audio channel, wherein the memory comprises instructions executable by the processor to monitor the keying device for keying a call to destination and registration the destination keyed numbers. The registration includes keyed choices for internal destination made once a telephone connection was established. Furthermore, the instruction executable by the processor detects if the call was put on-hold. This is accomplished by detecting a designated tone, or detecting background music, or detecting more than pre-defined seconds of no conversation.

Again further, the instruction executable by the processor monitors the audio channel of the device to initiate an alarm to notify the user if the call is on hold or is activated. The alarming process may include inserting of an alarm audio to the audio channel, or communicating flashing visual pattern to the display of the telephone device, or communicating variation request to the telephone device.

In another embodiment, the present invention provides a system. The system includes a processor and a memory coupled to the processor. Further, the memory includes one or more instructions executable by the processor to monitor information corresponding to voice interaction between a user and a telephone call destination for the call. The call may be established by the user with the destination by utilizing a calling device. Furthermore, the instructions executable by the processor may detect a status of the call. The status of call may either be 'on-hold' or 'active.

In yet another embodiment, the present invention relates to a method to enhance telephone calling. The method includes monitoring telephone call between a user and a destination. Further, the method includes registration of user initiated tone coded choices. Furthermore, the method includes detecting having the call been put on-hold by detecting a designated tone, or detecting background music, or detecting more than pre-defined seconds of no conversation.

BRIEF DESCRIPTION OF THE DRAWINGS

Figure 1A:
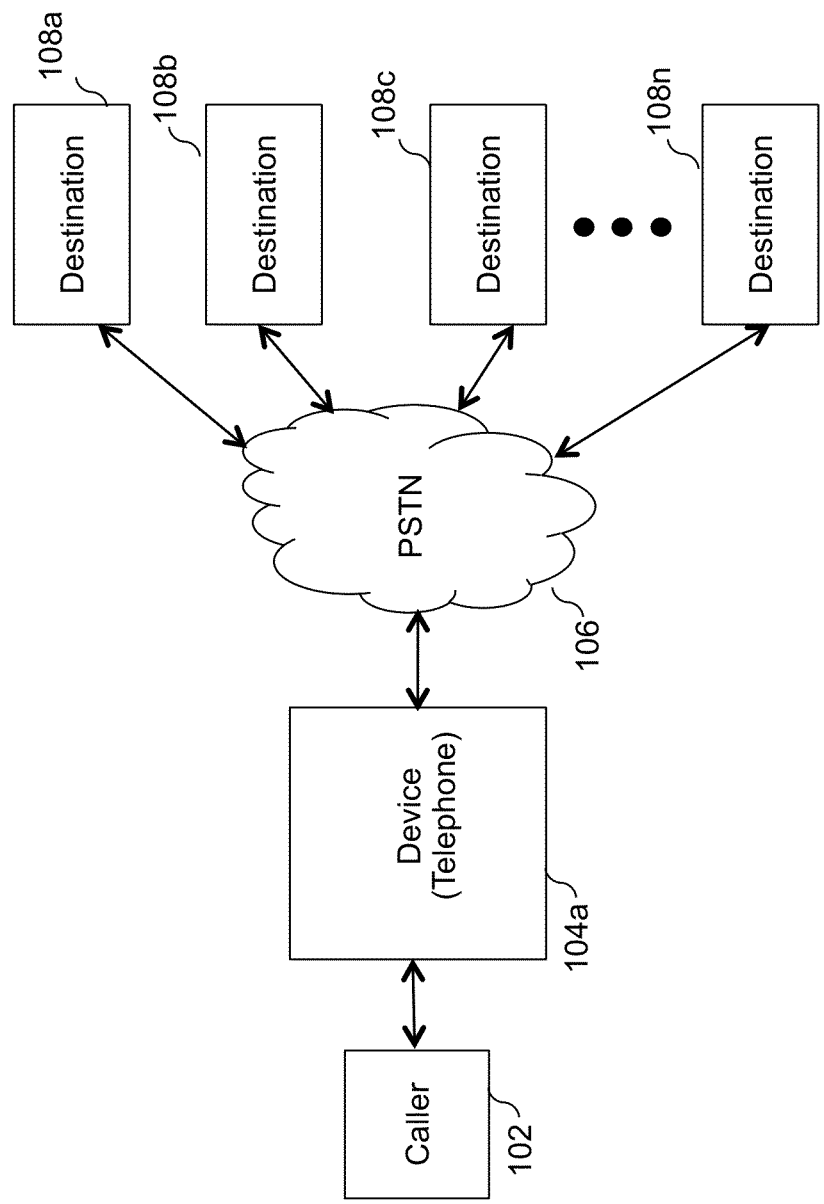
Figure 1B:
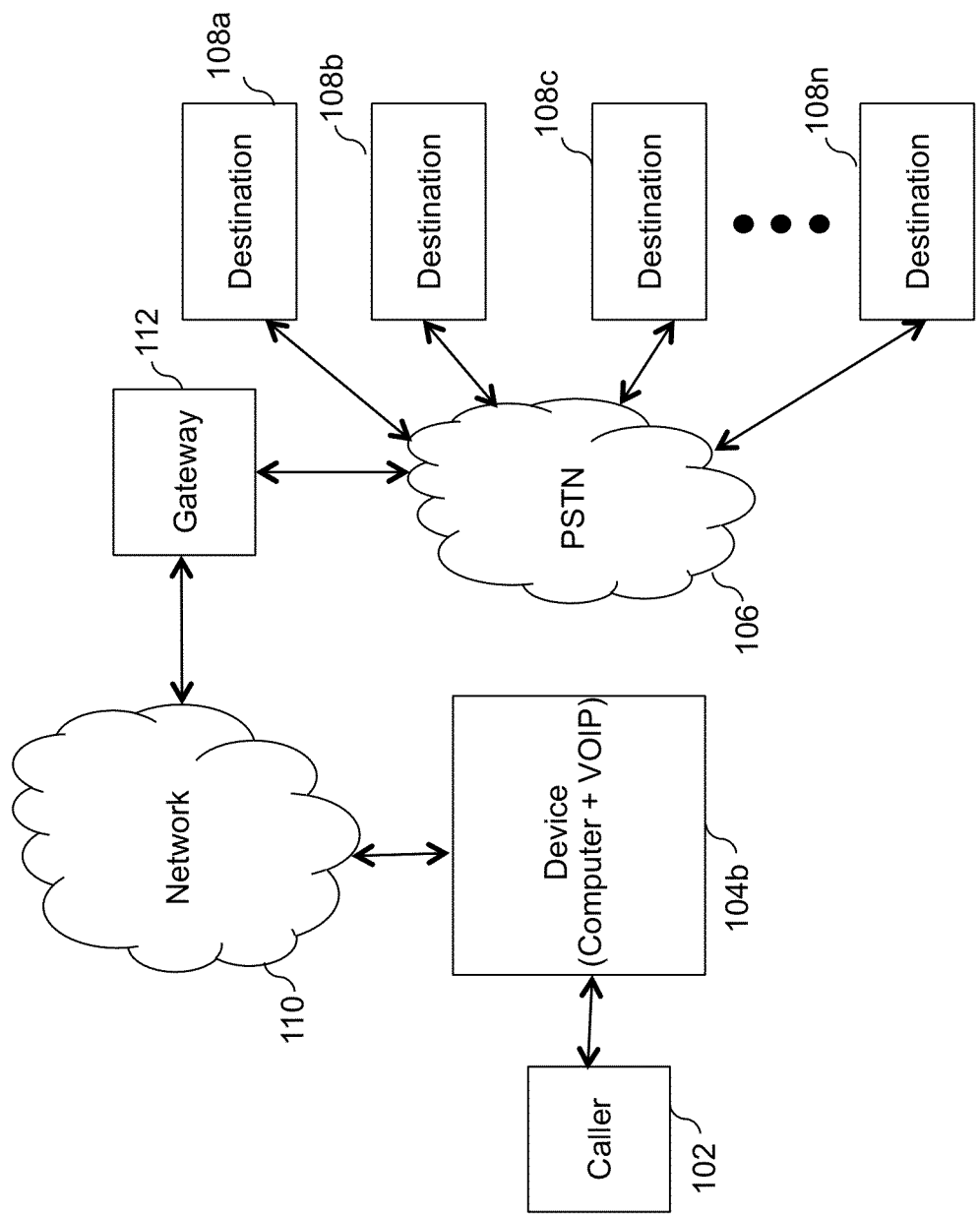
Figure 1C:
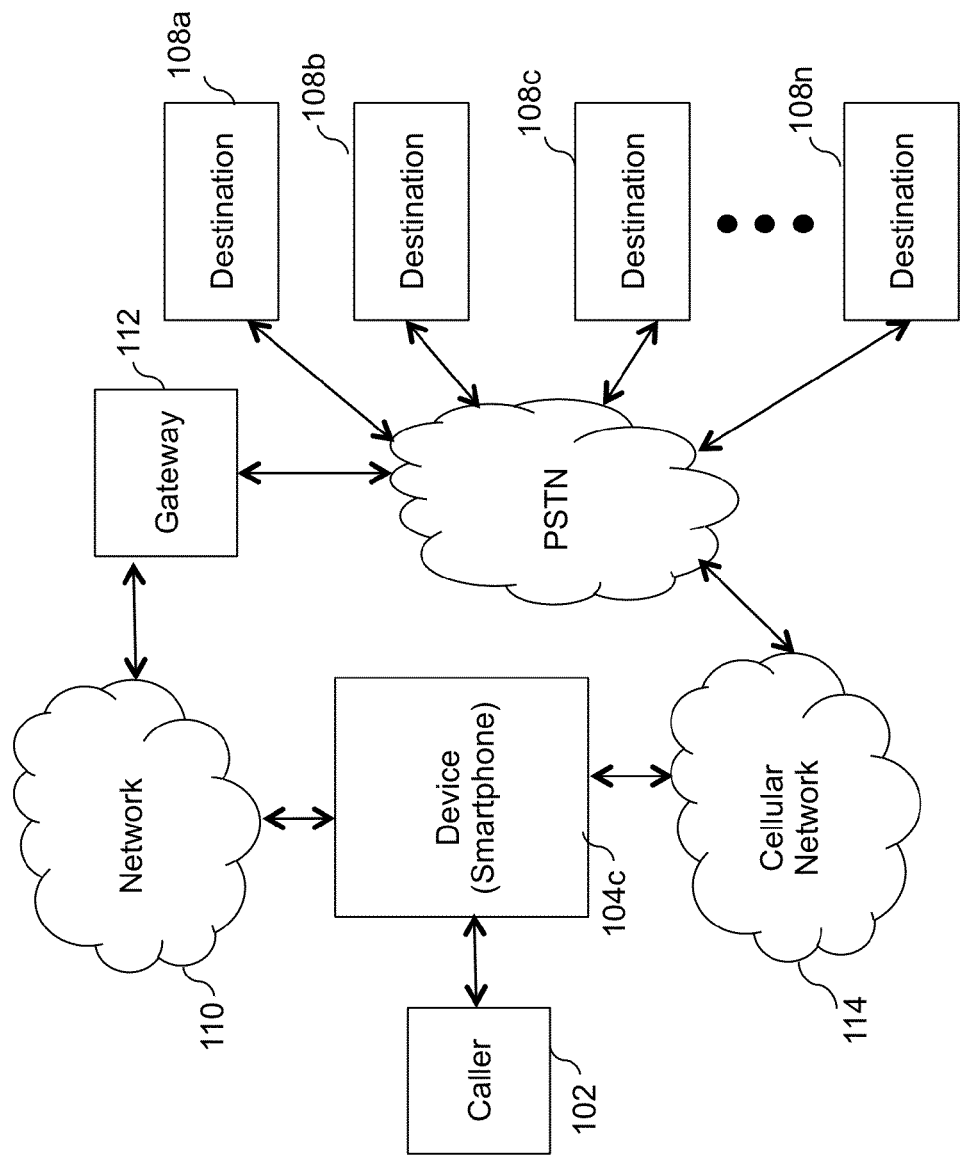
Figure 1D:
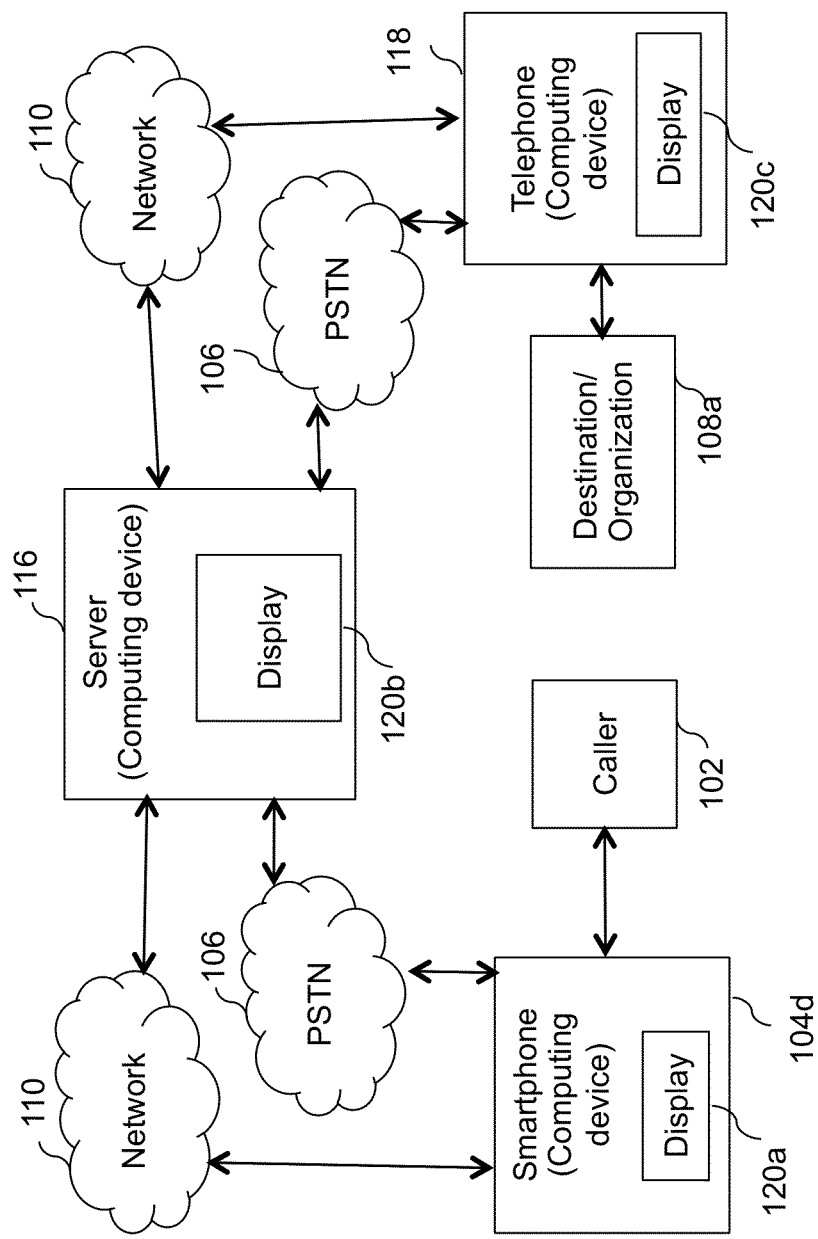
Figure 2:
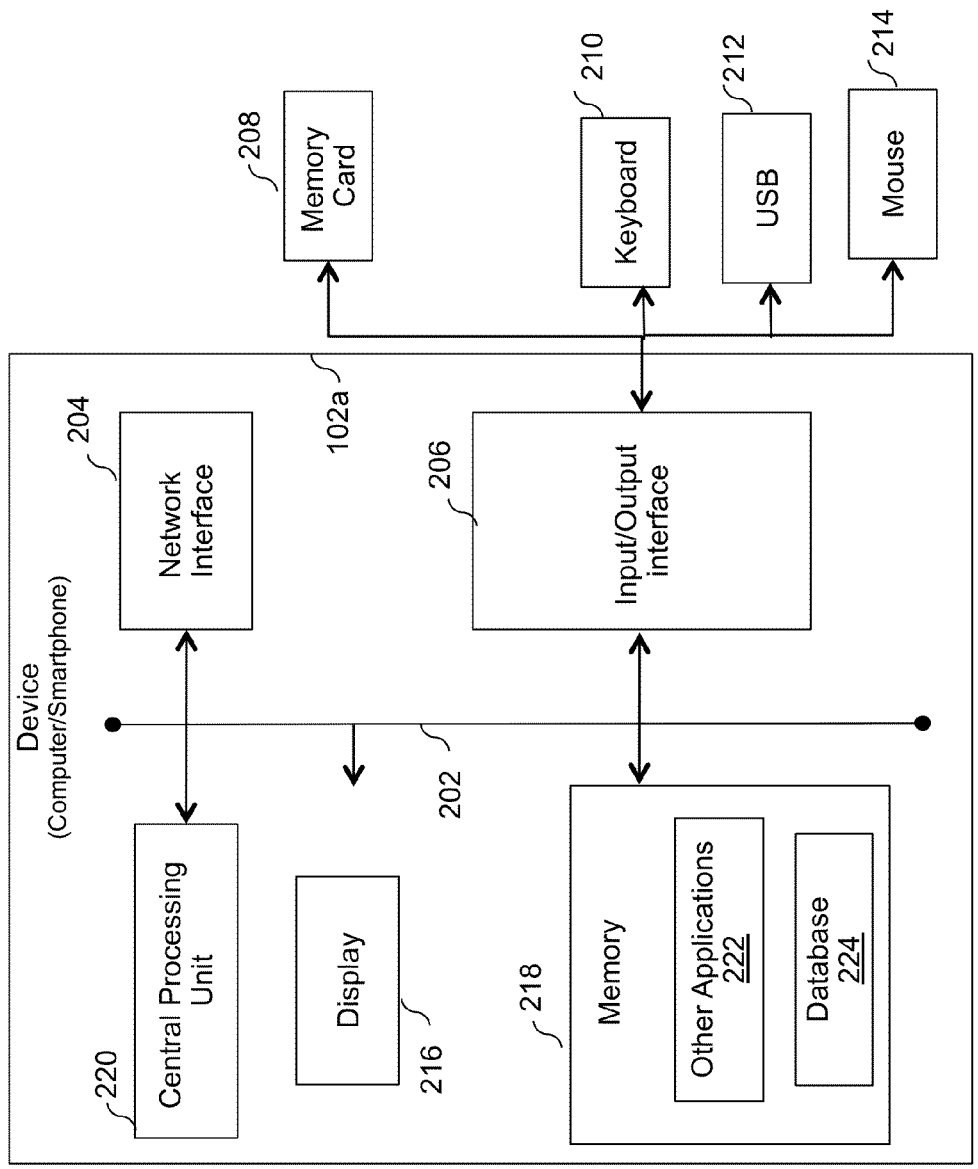
Figure 3:
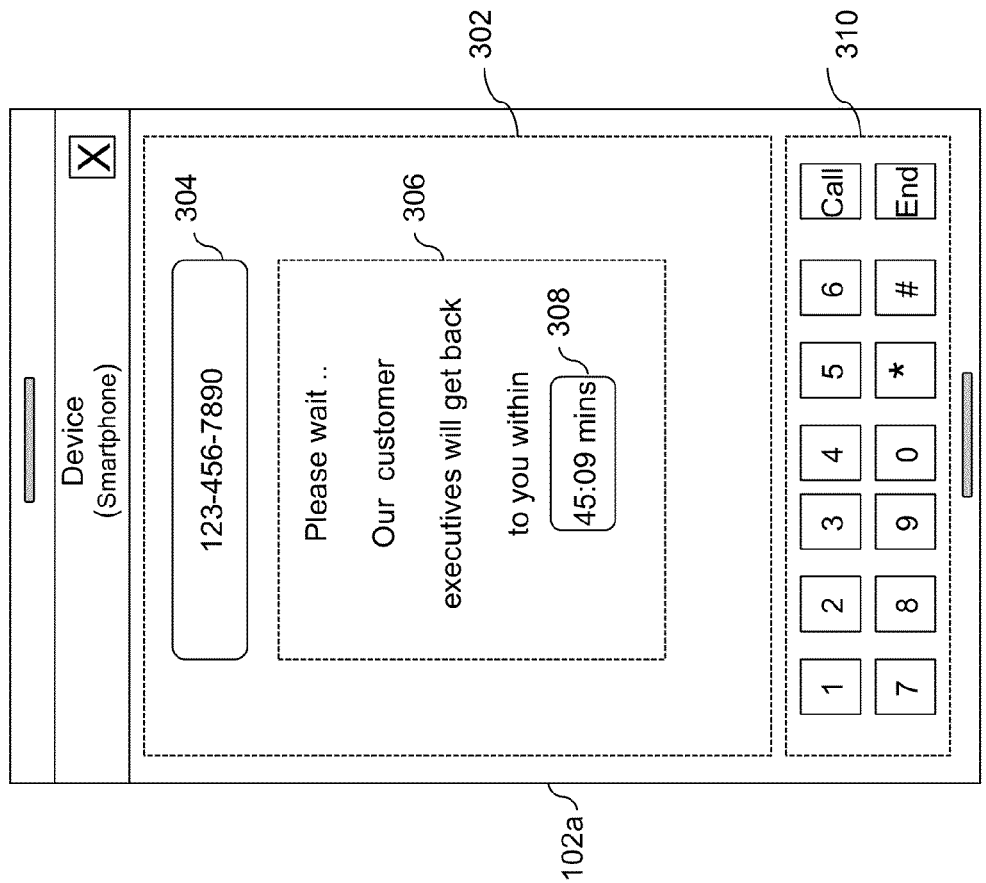
Figure 4:
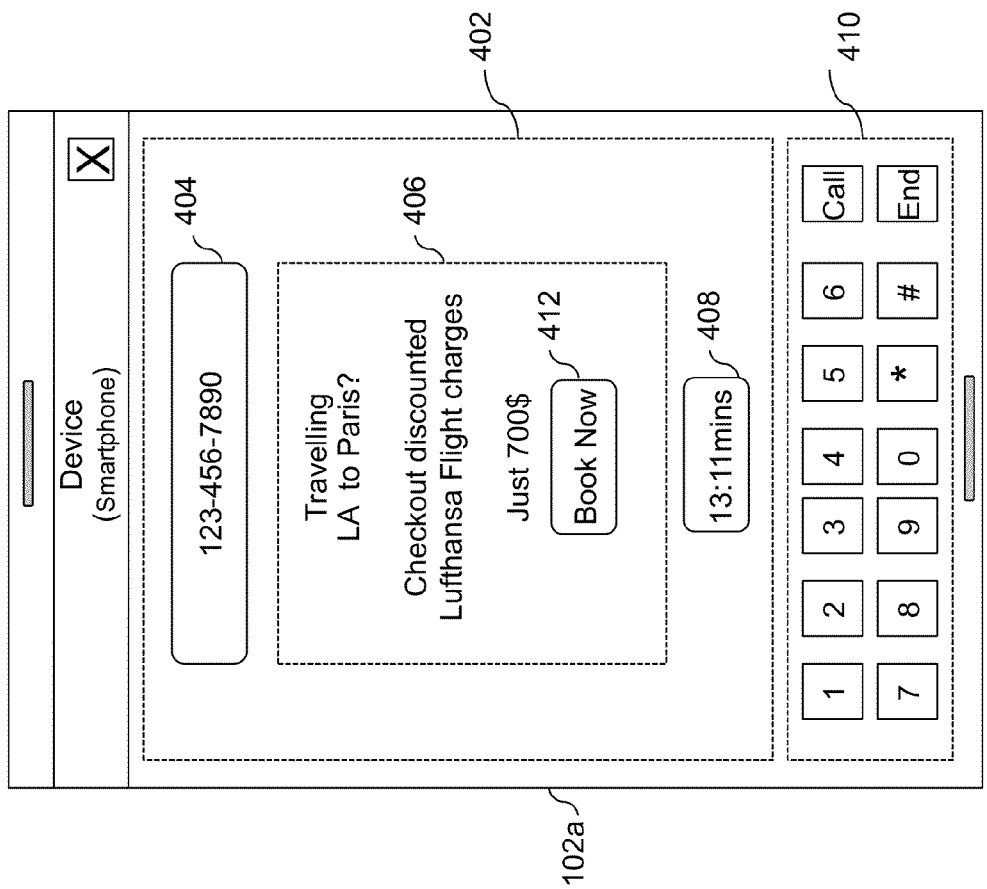
Figure 5:
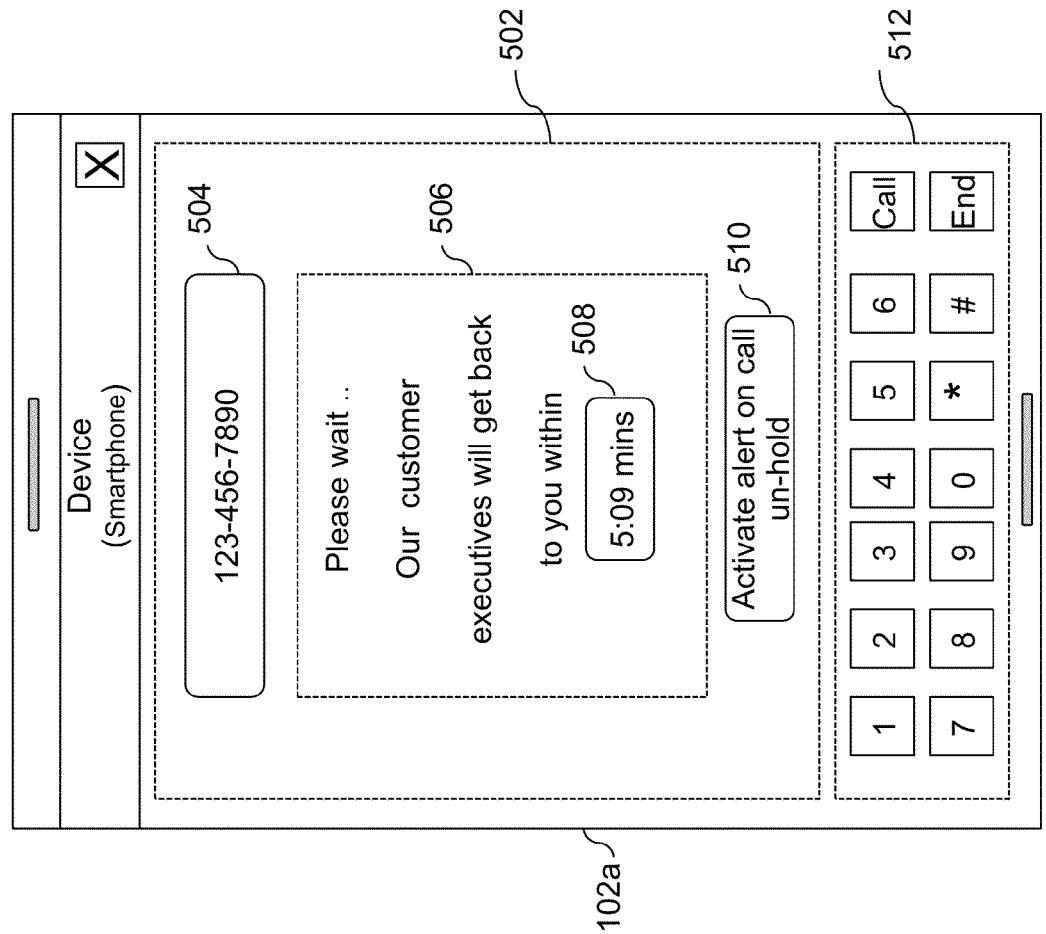
Figure 6:
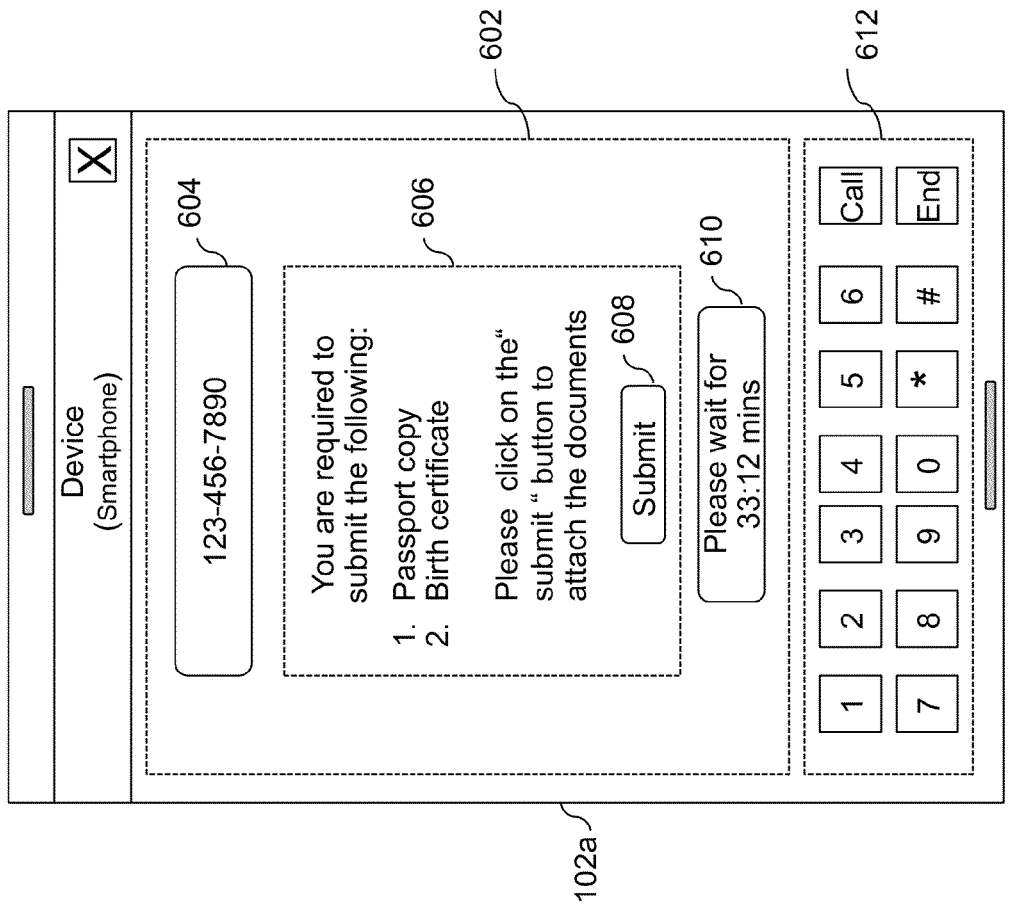
Figure 7:
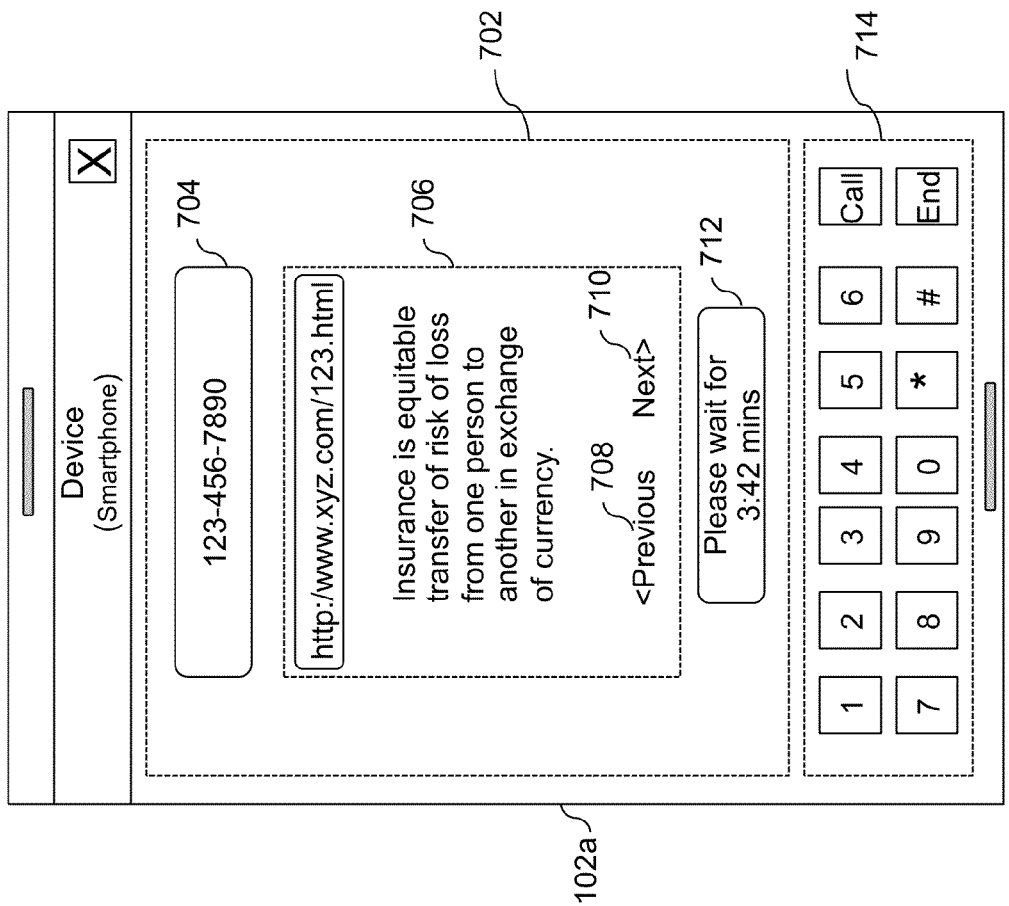
Figure 8:
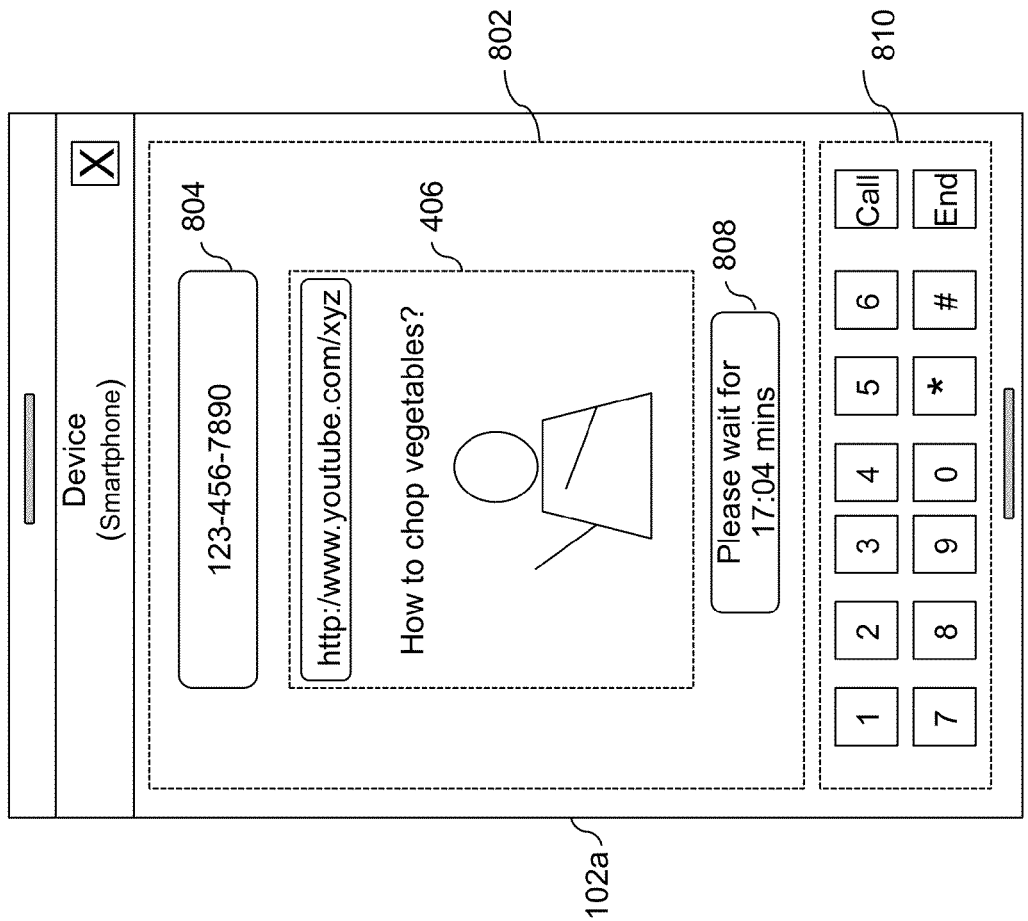
Figure 9:
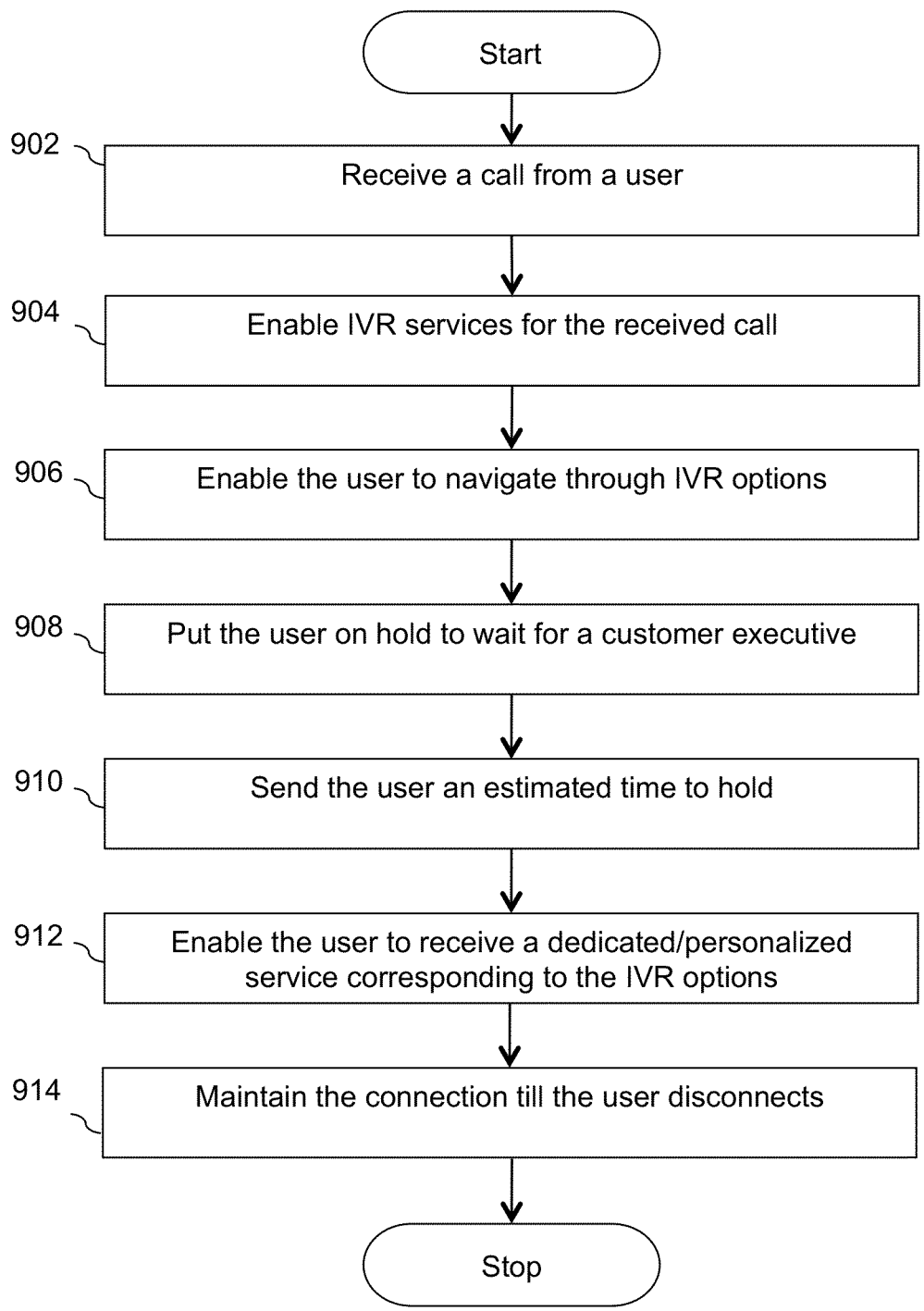
Figure 10A:
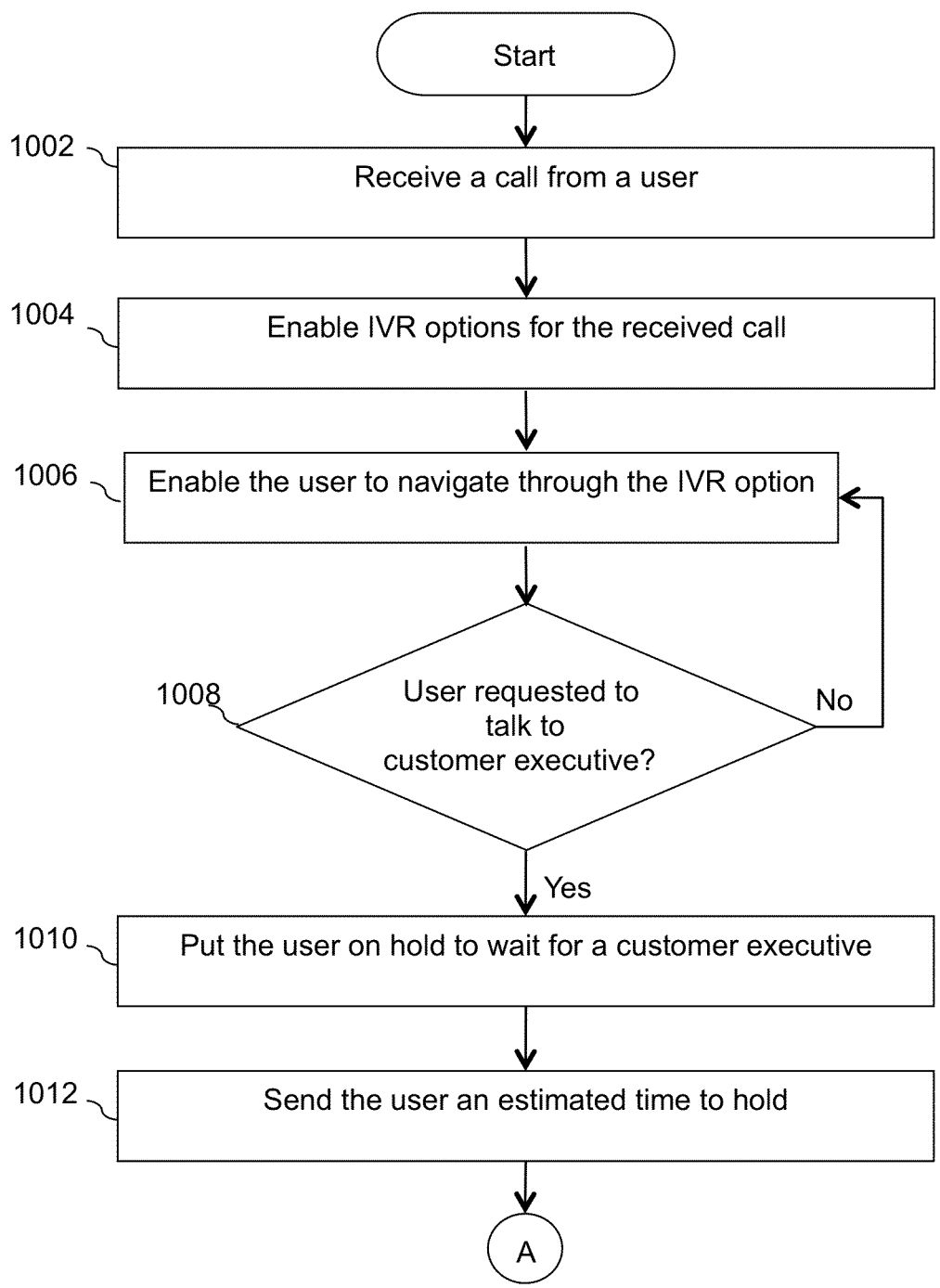
Figure 10B:
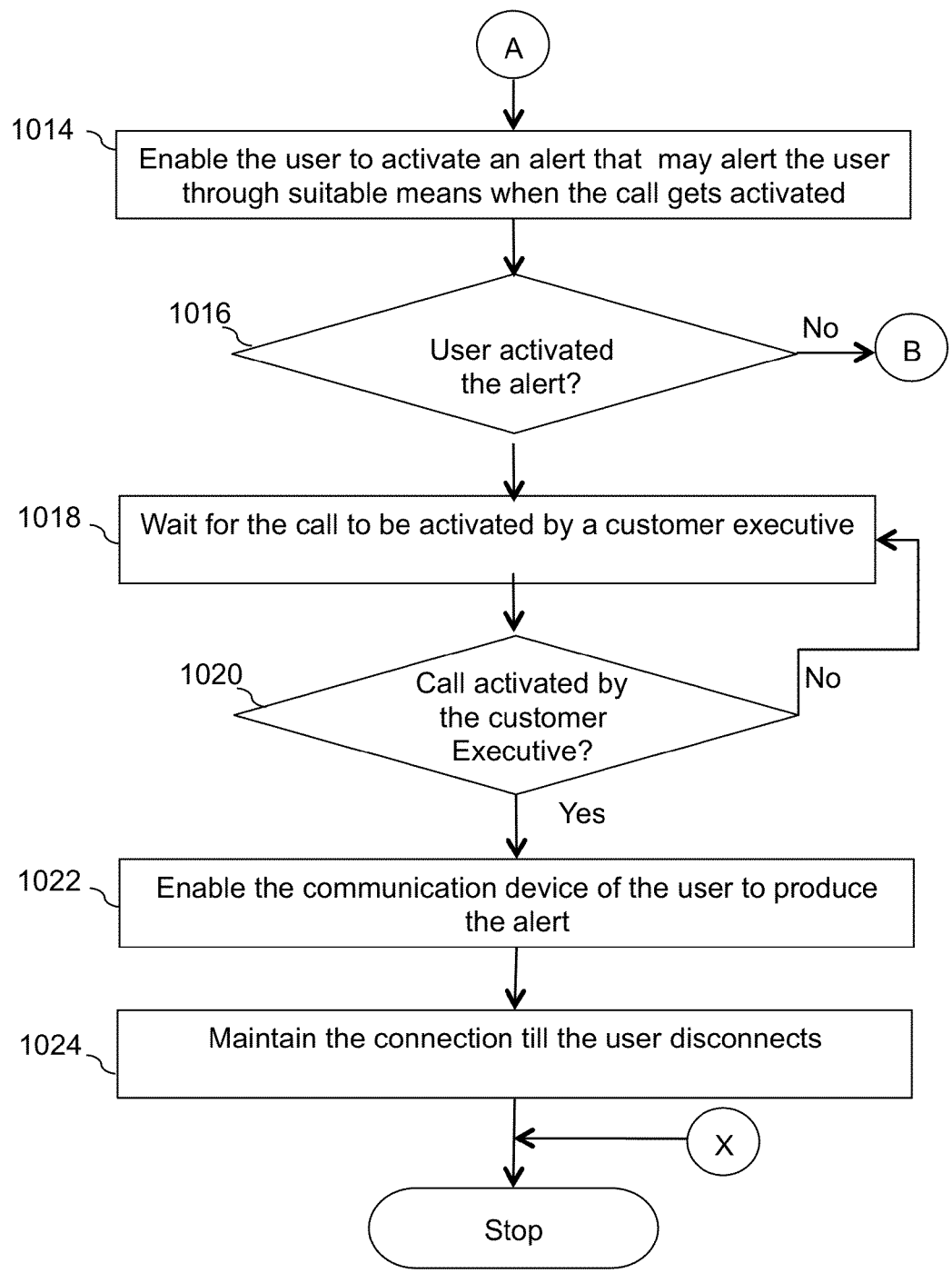
Figure 10C:
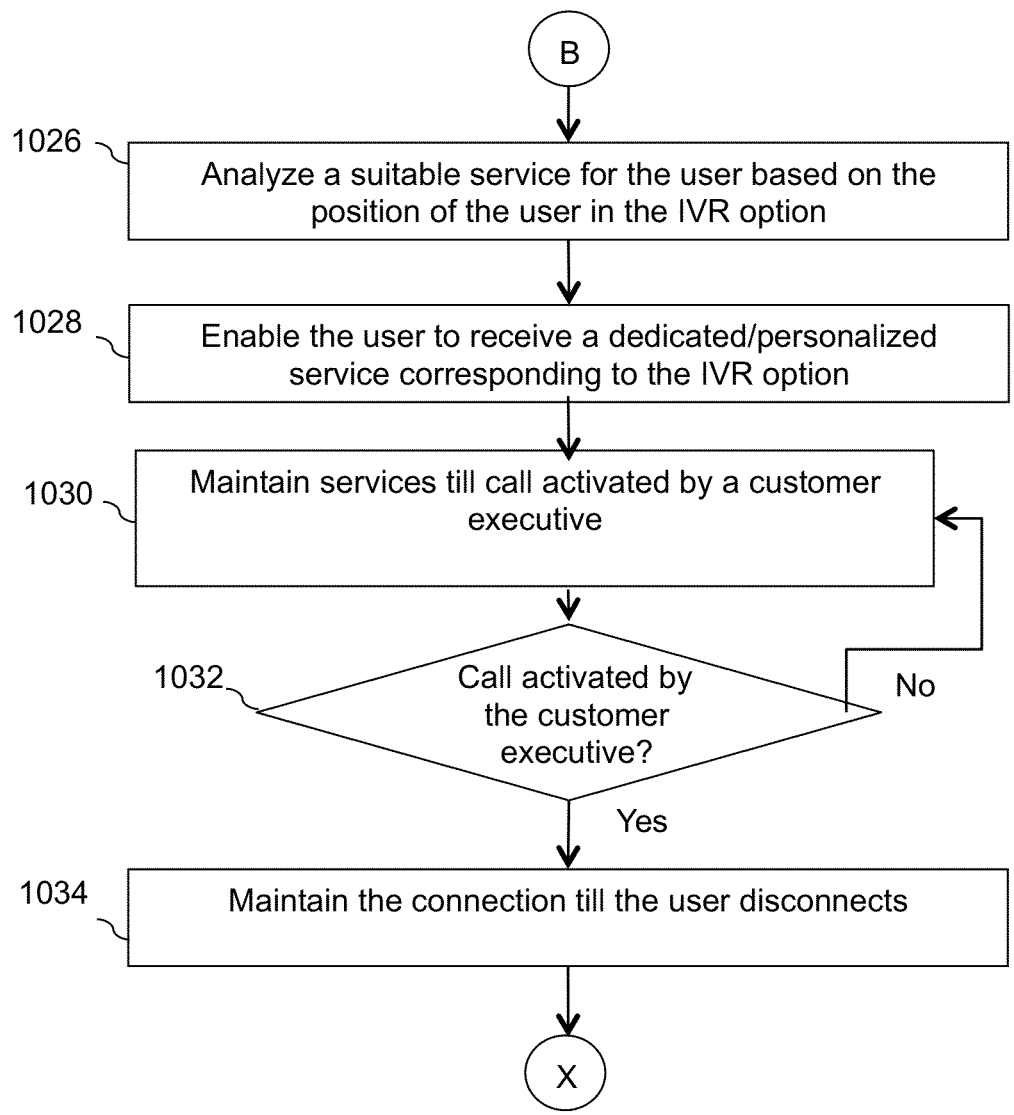
Figure 11A:
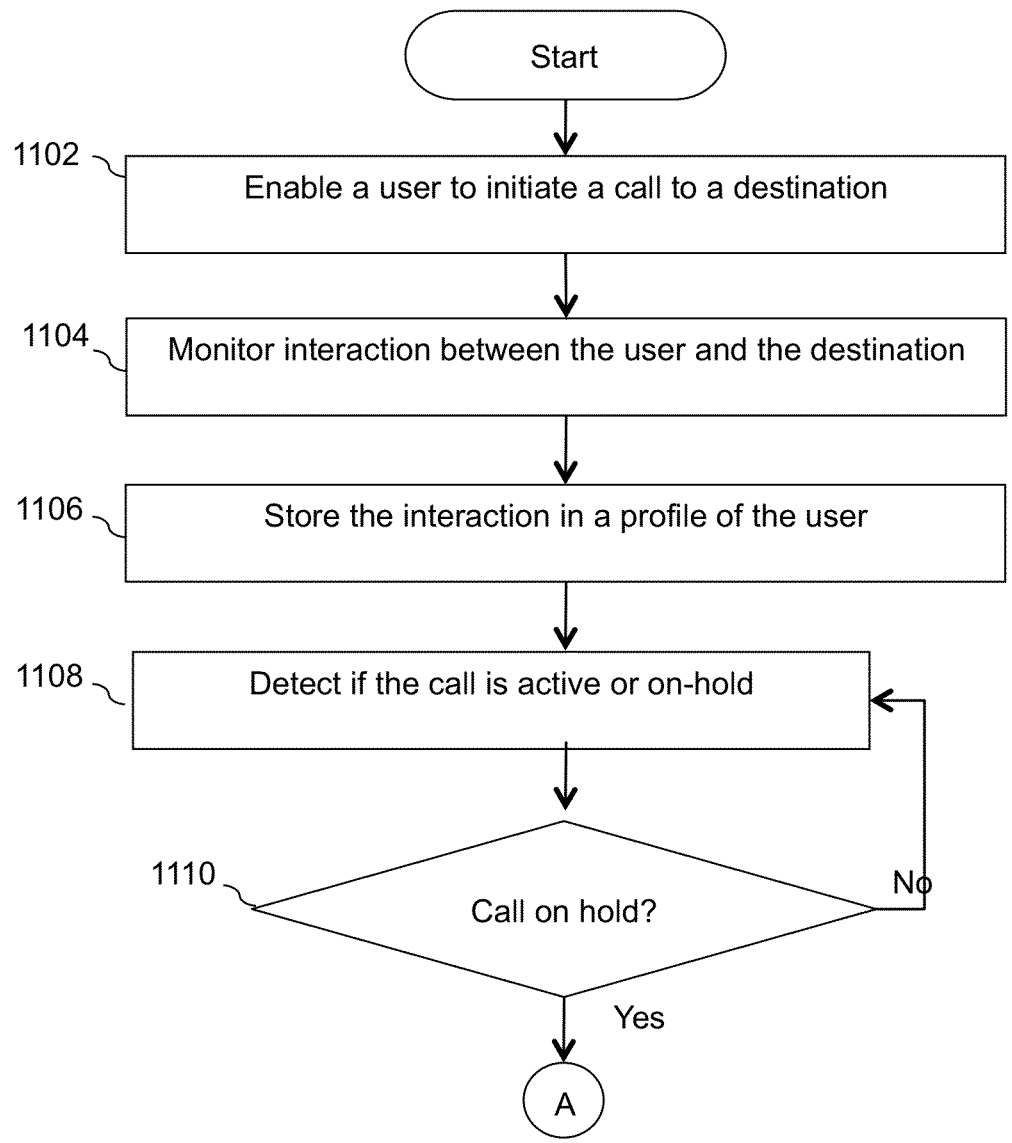
Figure 11B:
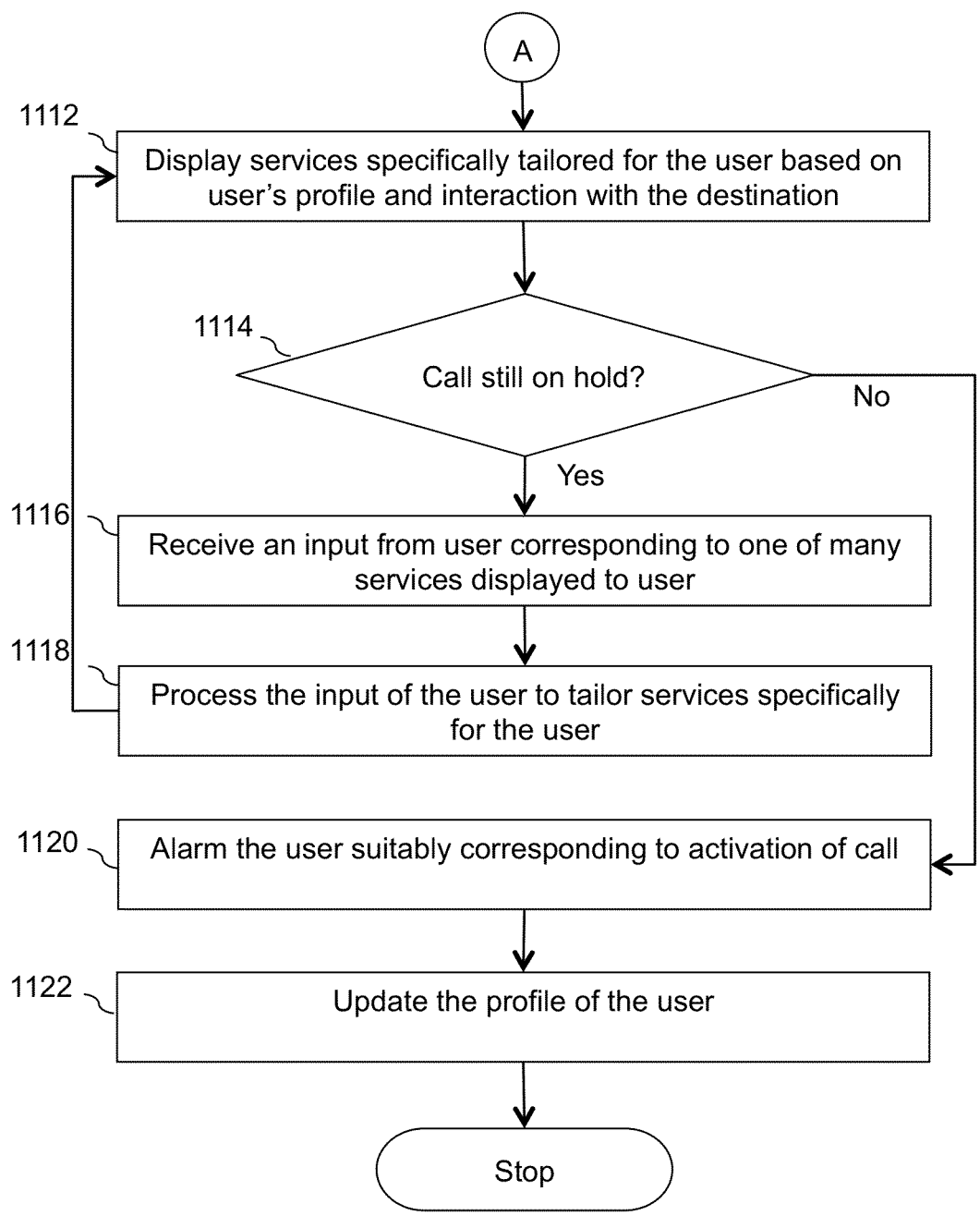

Having thus described the invention in general terms, reference will now be made to the accompanying drawings, which are not necessarily drawn to scale, and wherein:

FIG. 1a illustrates an exemplary environment where various embodiments of the invention function;

FIG. 1b illustrates another exemplary environment where various embodiments of the invention function;

FIG. 1c illustrates yet another exemplary environment where various embodiments of the invention function;

FIG. 1d illustrates still another exemplary environment where various embodiments of the invention function;

FIG. 2 illustrates exemplary components of a communication device, such as device 104a, in accordance with an embodiment of the invention;

FIG. 3 illustrates an exemplary service provided by an IVR system to a communication device in a call-on-hold duration, in accordance with an embodiment of the invention;

FIG. 4 illustrates an exemplary service provided by an IVR system to a communication device in a call-on-hold duration, in accordance with another embodiment of the invention;

FIG. 5 illustrates an exemplary service provided by an IVR system to a communication device in a call-on-hold duration, in accordance with yet another embodiment of the invention;

FIG. 6 illustrates an exemplary service provided by an IVR system to a communication device in a call-on-hold duration, in accordance with still another embodiment of the invention;

FIG. 7 illustrates an exemplary service provided by an IVR system to a communication device 102a in a call-on-hold duration, in accordance with another embodiment of the invention;

FIG. 8 illustrates an exemplary service provided by an IVR system to a communication device 102a in a call-on-hold duration, in accordance with still another embodiment of the invention;

FIG. 9 illustrates a flow diagram of a method for implementing IVR services for an on-hold caller, in accordance with an embodiment of the invention;

FIG. 10 illustrates a flow diagram of a method for alerting an on-hold caller concerning activation of the on-hold call, in accordance with an embodiment of the invention; and FIG. 11 illustrates a flow diagram of a method for detecting status of a telephone call in order to provide suitable services to its caller, in accordance with an embodiment of the invention.

DETAILED DESCRIPTION OF THE INVENTION

Illustrative embodiments of the invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1a illustrates an exemplary environment where various embodiments of the invention function. A user or a caller 102 (hereinafter may interchangeably be referred to as the 'user 102') may use a communication device 104a to access a telephony network, such as a PSTN 106, to connect to various destinations 108a-n. A person skilled in the art will appreciate that device 104a can also connect to a private telephone exchange. Examples of device 104a include, but are not limited to, a telephone, a mobile phone, a Smartphone, a tablet or any other device capable of voice or data communication.

Further, if the user 102 dials a telephone number from the device 104a in order to connect to any destination out of the destinations 108a-n, an audible Interactive Voice Response (IVR) menu may be played to the user 102. Each of destinations 108a-n can have different IVR menus. For example, the IVR menu of a hospital may be completely different from that of a pizzeria. Typically, the audible IVR menu provided by destinations 108a-n comprises audible options or instructions. User 102 may be required to select various options from the audible IVR menu to obtain required information or service from the dialed destination. Various types of destinations 108a-n that implement the audible IVR menu may include, but are not restricted to, banks, hotels, fast food outlets, utility services providers, corporate offices and so forth.

In an embodiment of the invention, the device 104a may include, but is not limited to, a processor, a memory coupled to the processor, an audio channel, and a display. The memory may include one or more instructions to monitor keys that may be pressed by the user 102 to dial a phone number related to a particular IVR destination. Further, the instructions may monitor one or more options that the user 102 may select through keyed choices to call an internal destination corresponding to the dialed IVR destination. For example, the user 102 may dial an 'account department (through one or more keyed choices) corresponding to a particular bank. Here, the bank is an IVR destination that may be monitored through keys selected to dial a phone number for connecting to the IVR destination (i.e., bank). The monitored information may detect a destination. In an embodiment, the memory may store information corresponding to destination database.

Further, the instructions may be used for detecting if the call is put on-hold. The call may be detected on-hold based on detecting a designated tone, or detecting background music, or detecting more than pre-defined seconds of no conversation. Furthermore, the instructions may be utilized for fetching information corresponding to the IVR destination that may be displayed on the display of the device. The information may correspond, but is not restricted, to information regarding the selected IVR option, advertisement corresponding to the destination, any instruction video, a specific data from a website, social networking page corresponding to the destination, LinkedIn page, recent emails received from the destination and recent news related to the destination. The device, such as the device 104a, is explained further in conjunction with FIG. 2.

FIG. 1b illustrates another exemplary environment where various embodiments of the invention may function. As shown, the communication device 104b is directly connected to a network 110. Examples of device 104b include, but are not limited to, a personal computer, a laptop, a mobile phone, a smart-phone, a fixed line telephone, Voice Over Internet Protocol (VOIP) phone or other devices capable of voice or data communication.

Further, the communication device 104b may include various applications or computer programs that may enable caller 102 (hereinafter may interchangeably be used as 'user 102') to use the device 104b for connecting to destinations 108a-n through PSTN 106 over the network 110. For example, the applications may be VOIP applications, such as, but not limited to, Skype, Magic Jack, Google Talk and so forth. A gateway 112 provides interconnection between the PSTN 106 and network 110. Examples of network 110 include any wired or wireless network, such as, but not limited to, a Local Area Network (LAN), a Wide Area Network (WAN), a Wi-Fi network and so forth. As discussed with reference to FIG. 1a, the destinations 108a-n present the audible IVR to user 102 when the user 102 dials a phone number to call the destination. Moreover, the device 104b may detect if call is put on hold. In an embodiment, the device may display information corresponding to the destination and actionable information to the user 102. The information corresponding to the destination may include, but is not restricted to, advertisements, content of a website, data regarding services and news corresponding to the destination. Further, the actionable information may include, but is not restricted to, form for required caller's (user 102) data that may be required by the destination, an alternative destination that may be considered by the user 102, schedule book to set up future appointment with any representative of the destination, alternative choice to set background music when call is on hold and interactive window to communicate with the destination. The device, such as device 104b, is explained further in conjunction with FIG. 2.

FIG. 1c illustrates yet another exemplary environment where various embodiments of the invention may function.

As shown, device 104c can be connected to various destination, such as destination 108a ... 108n, through PSTN 106 via network 110 or the cellular network 114. The destinations 108a, ... 108n (hereinafter may collectively be referred to as 'destination 108') may include various service providers that provide multiple or overlapping services to customers (such as caller 102). For example, cable television service providers may also provide phone and Internet service, optical Internet providers may also provide phone or television services, WiMax service providers may provide phone service and so forth. Network 110 may be any service provider that provides such services, for example, but not limited to, cell phone services, wireless services, Internet services, cable television services, or various combinations of the above or other type of services. As discussed with reference to FIGS. 1a and 1b, destinations 108a-n present the audible IVR to user 102. In an embodiment, device 104b may include an application software to display information corresponding to various departments of the connected destination when call, with the destination, is on hold.

FIG. 1d illustrates still another exemplary environment where various embodiments of the invention may function. As shown, the user (caller 102) of a computing device 104d can be connected to the destination 108a via a server 116. In an embodiment, the server 116 may be a server of network service provider of the device 104d or can be any other third party server. Further, the device 104d can be connected with the server 116 via the PSTN 106 or through network 110 or through any other wireless or wired network. Similarly, the server 116 can be connected to a computing device 118 of the destination 108a via the PSTN 106 or through network 110 or through any other wireless or wired network.

Further, the computing devices 104d, 116, and 118 includes display systems 120a, 120b, and 120c respectively. The displays 120a, 120b, and 120c may be used to view information that may be exchanged between the computing devices 104d, 116, and 118. Furthermore, computing device 118 may have similar functionalities as the computing device 104d to enable the destination/organization representative to communicate with the user/caller 102.

The server 116 may include a database to store information corresponding to the destinations, such as the destination 108a. In an embodiment, the server 116 may be configured to provide services to the caller 102 when a call, to the destination 108a, is on hold. The services may include, but is not restricted to, advertisements related to the destination 108a, advertisements from competitors of the destination 108a, information corresponding to the destination 108a, and recent news corresponding to the destination 108a.

Further, in an embodiment, the device 104d may detect if the call between the caller 102 and the destination 108a is put on-hold. Such detection of status of the call (to determine if the call is on on-hold) may be based on, but not limited to, detecting a designated tone, background music or by detecting more than pre-defined seconds of no conversation between the caller 102 and a receiver (corresponding to the destination 108a) who receives the call of the caller 102. In another embodiment, the server 116 may be configured to detect status of the call between the user 102 and the destination 108a to ensure services for the user 102 during the call on hold. The server may detect the status of the call based on one or more ways such as, but not limited to, detecting a designated tone, or detecting background music, or detecting more than pre-defined seconds of no conversation. Accordingly, the server may provide one or more information and/or actionable items corresponding to the called destination 108a on detecting the call on hold.

In an embodiment, the server may extract information from the destination 108a for providing to the display 120a. The information provided to the display 120a may be viewed and accordingly utilized by the caller 102. Further, in an embodiment, a phone number (corresponding to the computing device 120c) that may be dialed by the caller may be monitored by the computing device 104d. The monitored information, corresponding to the dialed destination 108a, may be provided to the server 116 for fetching, from the database of the server 116, the information corresponding to the destination 108a. Further, the computing device 104d may fetch the information, corresponding to the destination 108a, from the memory thereof and display the information on the display 120a.

FIG. 2 illustrates exemplary components of a communication device, such as device 104a, in accordance with an embodiment of the invention. Device 104a includes a system bus 202 to connect its various components. Examples of system bus 202 include several types of bus structures including a memory bus or memory controller, a peripheral bus, or a local bus using any of a variety of bus architectures. As discussed with reference to FIG. 1a, device 104a can be a device such as a computer, a Smartphone and so forth. Device 104a may connect to a PSTN through a gateway that may be connected to the network through a network interface 204. Further, the device 104a includes an Input/Output (IO) interface 206 that may be configured to connect with external or peripheral devices such as a memory card 208, a keyboard 210, a Universal Serial Bus (USB) device 212 and a mouse 214. Although not shown, various other devices can be connected through I/O interface 206 to device 104a. In an embodiment of the invention, device 104a may be connected to a hub that provides various services such as voice communication, Internet access, television services and so forth. For example, the hub may be a home gateway device that acts as a hub between the home environment and the broadband network.

Further, the communication device 104a includes a display 216 to output graphical information to the user of the communication device 104a. In an embodiment of the invention, the display 216 may include a touch sensitive screen. Therefore, the user can provide inputs to the device 104a by touching the display 216 or by point and click using the mouse 214. Furthermore, a memory 218 of device 104a stores various programs, data and/or instructions that can be executed by a central processing unit (CPU) 220. Examples of memory include, but are not limited to, a random access memory (RAM), a read-only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by device 104a.

Memory 218 may include an operating system (OS) (not shown) for the device 104a to function. Further, the memory 218 may include other applications 222 that may enable the user to communicate with destinations 108a-n. Examples of other applications 310 include, but are not limited to, Skype, Google Talk, Magic Jack, and so forth. Other applications 222 may be stored as software or firmware on device 104a. Further, memory 218 may include a database 224 that stores an instructions set (not shown) executable by a processor, such as the central processing unit 220. In an embodiment, the instruction set, when executed by the central processing unit 220, enable the device to display a window for displaying data received, from the connected destination, in real time.

In an embodiment of the invention, the CPU 220, display 216, and memory 218 of a device may perform in collaboration as a system wherein the memory 218 comprises database 224 and an instruction set. The instructions set may store instructions executable by the central processing unit 220 to monitor a telephone call initiated by the user of the device to any destination. Further, the device (or the system) may also monitor the contact number that may be keyed by the user for establishing a connection with the destination. In an embodiment, the database 224 may store monitored information corresponding to the established connection with various destinations along with their respective contact information. The device 104a may also store the information in a remote depository that is connected with the device via internet or intranet. Furthermore, the device 104a may monitor and store any registration information provided to the connected destination or may monitor keyed choices made by the user to navigate deep into the IVR menu provided by the connected destination.

Furthermore, the instruction set may store instructions executable by the central processing unit 220 to detect state of a telephone call, i.e. if a telephone call is active or on-hold. The state of the call may be detected by various means such as, but not limited to, detecting a designated tone, detecting background music, detecting a key press, or detecting no conversation for pre-defined interval of time. In an embodiment, the pre-defined interval of time may be 15 seconds. The aforementioned means may enable the system to detect if a connected call is active or is on hold. In an embodiment, if the call is on hold, the system may provide various services or actionable items on a display, such as the display 216, for the user. In an embodiment, the instructions may fetch information, corresponding to the destination, from the database 224. In another embodiment, the information corresponding to the destination may be fetched by a remote repository that may be accessed by the device. The information corresponding to the destination may include visual information corresponding to the destination. The visual information may include, but is not limited to, advertisement(s) related to the destination, content of a web site related to the destination, data regarding services provided by the destination, social network page of the destination, LinkedIn page of the destination, recent emails received from the destination, and recent news related to the destination.

Further, the device may receive actionable information from the destination. The actionable information may include actionable items that may enable the user to perform one or more actions corresponding to the destination when the status of the call is on-hold. Examples of the actionable information may include, but are not limited to, information corresponding to the destination's function and common alternative destination(s) that may be considered by the user, form of required caller data that may be required by the destination, schedule book to set up future appointment with the destination's representative, alternate choices for background music, interactive window to communicate (by keying) with the destination. Further, in an embodiment, the system may enable the connected destination to provide services to the user (caller). In still another embodiment, the system may connect to a third party to receive services during the hold time of the telephone call.

In an embodiment of the invention, during the hold time of the telephone call, the user may listen to background music. The background music may be provided by the IVR system, network service provider of the user, third party, or by the device itself. Further, the user may be facilitated to change the background music that may be pre-set background music. The instructions executable by the central processing unit 220 may display, to the user, a list of options corresponding to background music that the user can select as new background music. After selecting new background music, the user may always listen to the selected background music, whenever the telephone call goes on hold. In an embodiment, the device 104a may detect any of such background music to determine if the call is on hold or not.

Additionally, the instruction set may store instructions executable by the central processing unit 220 to retrieve information from the connected destination corresponding to functioning process of the destination. The functioning process may be helpful to the user to determine if the user is connected to desired destination or not. Further, the information retrieved from the connected destination may also include details corresponding to various alternate destinations those serving similar services. In an embodiment, the alternate destinations may be suggested to the user based on the previous communications of the user with other destinations. In another embodiment, the alternate destinations may be suggested to the user based on the personal information of the user stored in the database 224 of the device 104a.

Further, in an exemplary embodiment of the invention, the instructions stored in the memory 218 of the device 104a may enable the user to watch videos that may be received from the connected destination in real time and may be of interest to the user. For example, the device may receive a video corresponding to various services offered by the destination. In an embodiment, the device may receive only a web URL of a video from the connected destination and may use its own network to stream the video online. In addition, the instructions may be configured to support the connected destinations by providing them a platform to display desired data on the device 104a of the user. For example, the instructions may display an estimate of a time period, received from the connected destination, for which the user of the device needs to remain on hold.

In an embodiment, the instructions may provide information to the connected destination corresponding to specifications of the communication device used by the user to connect to the connected destination. Based on such information, the connected destination may determine suitable services for the user. In addition, the connected destination may also determine a suitable service for the user based on the amount of time left for the user to remain on hold.

Again further, the system (or the device) may enable the user of the communication device to initiate an alert in the communication device that may alert the user of the communication device on activation (un-hold) of the call. The alert may include, for example, an audio alert, vibration alert, flashing visual pattern alert and so forth. Still further, while on hold, the instructions, when executed by the central processing unit 220, may display to the user of the communication device a list of names of documents, received from the connected destination, which the user is required to submit to the connected destination. Moreover, the instructions, when executed by the central processing unit 220, may provide the user of the communication device an interactive window that may enable the user to submit the required documents to the connected destination during the call on-hold and may also enable the user to communicate with the destination by press of suitable keys that are required by the connected destinations as input from the user.

In an embodiment, the instructions, when executed by the central processing unit 220, may enable the communication device to display additional information about the connected destination in a window. In an embodiment, this additional information is received by the connected destination. In another embodiment, the information is searched from the Internet. In yet another embodiment, the additional information is retrieved from the memory of the communication device. Further, additional information may include, but is not restricted to, general information about the connected node, recent chat or email exchanged with the connected destination, scheduled work or meeting with the connected destination, recent news related to the connected destination, website of the connected destination, social network page of the connected destination, complaints submitted by other people for the connected destination, recent tweets about the connected destination etc. Furthermore, the system (or device) may open a window with a form received from the connected destination that is required to be filled by the user to save time in the service proceedings provided by the connected destination.

FIG. 3 illustrates an exemplary service provided by an IVR system to a communication device 102a in a call-on-hold duration, in accordance with an embodiment of the invention. The display screen 302 of the user includes information corresponding to the dialed number 304. In an embodiment, the dialed number 304 corresponds to the destination's IVR system. Further, the display screen 302 includes a visual window 306. In an embodiment, the visual window includes information received from the IVR system. The visual window 306 further includes an area 308 that provides information corresponding to the amount of time the call will remain on-hold. Additionally, the visual window 306 may include such information (not shown) that may require the user's input. In such a case, the user may provide input by using a keypad 310 of the communication device.

In an embodiment, a user may dial a phone number 304 corresponding to a destination using the keypad 310. The keypad 310 may be a physical keypad or a virtual keypad displayed on a touch screen display 302. Subsequently, the visual window 306 corresponding to the phone number 304 is displayed on display 302. Further, in an exemplary instance, if the user dials a phone number of an IVR destination, then the user may navigate through various IVR options and may select an option that requires the user to hold the call for certain duration. In the hold duration, a visual window may be opened on the device 104a. The visual window may be capable of displaying various types of data or information corresponding to the IVR destination. In an embodiment of the invention, the visual window 306 displays information corresponding to an IVR option selected by the user. However, based on the past experience of the organization (destination) with other users and of the user with the selected IVR option, the destination may provide the user with an option to transfer the call to another IVR option or to another department of the destination. Such option may be accessible to the user through the visual window 306.

Further, the visual window 306 may be utilized by the destinations to provide information to the user of the communication device 104a. In an embodiment, the information can also be in the form of instructions for the selected IVR node and for the various issues that are taken care of by the selected IVR option. Specifically, destinations may provide customized information in the visual window 306 for the user. Information for the visual window 306 may be customized based on a profile of user and based on the IVR option selected by the user. In an embodiment of the invention, the profile may be generated based on access patterns of user or the data capture by a hub connected to device 104a. In addition, the profile may include personal information of user and a record of previous activities of the user with the IVR system. In an embodiment, the information may be customized based on the general inquiries of the users on a particular IVR option.

Furthermore, the capability of the device may be detected before displaying the visual window. For example, in case device 102a is a basic mobile phone with limited functionality of the display screen, a visual window in the form of a simple list may be provided to the display of the device 302. Similarly, a list may be displayed in case of fixed line telephones. Moreover, in case the device 104a includes a high capability screen, such as, but not limited to, an iPhone or a tablet, then the visual window may be displayed in the form of graphics. Again further, in an exemplary embodiment of the invention, during the hold time of the call, the IVR system may analyze the hold-duration for the call and may decide whether to let the user remain on-hold or to schedule an appointment with the user to call back at a better time. In an embodiment of the invention, the device 102 may have a schedule book that may be used to store information corresponding to future appointments scheduled with the destination's representatives. The schedule information may be displayed to the user through a visual window. In another embodiment, a visual window may be provided to the user for allowing the user to initiate a call re-schedule request to the IVR system.

FIG. 4 illustrates an exemplary service provided by an IVR system to a communication device 102a in a call-on-hold duration, in accordance with another embodiment of the invention. The display screen 402 of the user includes information corresponding to the dialed number 404. In an embodiment, the dialed number 404 corresponds to the destination's IVR system. Further, the display screen 402 includes a visual window 406. In an embodiment, the visual window includes information received from the IVR system. Further, the display screen 402 includes an area 408 that provides information corresponding to the amount of time the call will remain on-hold. Additionally, the visual window 406 may include such information (not shown) that may require user's input. In such a case, the user may provide input by using a keypad 410 of the communication device.

In an embodiment, a user may dial a phone number 404 corresponding to a destination for booking an airline ticket from Las Angeles to Paris. While navigating through various stages of the IVR ticket booking system, the IVR system may put the call of the user on-hold. At the hold time, in an exemplary instance, the IVR system may provide advertisements tailored for the user. The advertisements may be tailored based on the IVR option selected by the user. Further, the advertisements may be tailored based on the user's profile and based on the user's previous activities with the IVR system of the connected destination. The advertisements may be displayed on the visual window 406. Advertisements may correspond to the type of services provided by the dialed destinations. For example, if the destination dialed is a pizzeria, then the advertisement may include, but is not restricted to, promotions or offers about a new pizza.

Moreover, the advertisement may include promotions or offers from a third party or a competitor of the destination. In an embodiment, the competitor is aware of the needs of the user through the navigation status of the user in the IVR system. Therefore, the competitor may be in a very good position to specifically offer the customer a discounted or attractive deal. An attractive deal at a very crucial time, when a user is on-hold, may be very beneficial for the competitors. Further, as shown, the visual window 406 of the display screen 402 includes an advertisement from a competitor of the destination. The competitor is offering the user a discounted flight seat from LA to Paris, as required by the user.

Furthermore, the visual window 406 of the display screen 402 includes an area 412. The area 412 may be a command button and may enable the user to directly navigate to a webpage from where the user can buy the discounted tickets from LA to Paris. It may be appreciated by a person skilled in the art that the advertisements are not specific to airline ticket booking and may correspond to any product or service.

Further, the device may extract information, from a remote database (not shown), corresponding to advertisements related to the destinations. Such database containing advertisements corresponding to the connected IVR destination may hereinafter be referred to as 'advertisement database'. The advertising database may include advertisements related to the phone numbers of the destinations. The advertising database may be stored in the device itself, in destination's server, in service provider's server, or in other third party servers. Further, the advertisements may be provided based on the profile of the user. For example, assuming that the user calls a bank holding regarding his saving account, then the advertisement displayed to the user may be based on the location, address, account balance, type and volume of transactions, loans, purchases and so forth.

Furthermore, the device may be configured to connect to an intended destination when the user selects corresponding advertisement. In an embodiment, the device may store the interactions of the user with visual windows. For example, the numbers dialed by the user may automatically be stored in the memory of the device. Moreover, the learned numbers or choices are associated with the dialed phone number of the destination. Therefore, the user may be assisted in his/her future calls accordingly.

FIG. 5 illustrates an exemplary service provided by an IVR system to a communication device 102a in a call-on-hold duration, in accordance with yet another embodiment of the invention. The display screen 502 of the user includes information corresponding to the dialed number 504. In an embodiment, the dialed number 504 corresponds to the destination's IVR system. Further, the display screen 502 includes a visual window 506. In an embodiment, the visual window 506 includes an area 508 that provides information corresponding to the amount of time the call will remain on-hold. Furthermore, the display screen 502 includes an area 510 that enables the user to activate an alert that may alarm the user as soon as the on-hold call gets activated. Additionally, the visual window 406 may include such information (not shown) that may require the user's input. In such a case, the user may provide input by using a keypad 512 of the communication device.

In an embodiment, a user may dial a phone number 504 corresponding to a destination for cancelling a cellular service. The cancellation procedure may require the user to navigate through various stages of the IVR system. While navigating through various stages of the IVR system, the IVR system may put the call of the user on-hold. At the hold time, in an exemplary instance, the IVR system or the communication device 102a may allow the user to activate an alert. After activating the alert, the user may not be required to pay attention towards the status of the on-hold call. The user may keep the communication device in pocket and may pay attention to other matters. The alert may be triggered as soon as the call on-hold gets activated. The alert may alarm the user through an audio, video, flash, or vibration alert. The user may then direct attention to the communication device and may proceed with the proceedings of the IVR system.

In another embodiment of the invention, the communication device 102a or the IVR system may enable the user to activate an alert. In an embodiment, the alert may only be initiated if the user is at on-hold-call status. The alert may enable the user to disconnect from the IVR system and the IVR system may call the user back as soon as the hold time period gets over. This may enable the user to drive attention to other works and may be able to save a lot of time that usually gets wasted while waiting on-hold.

FIG. 6 illustrates an exemplary service provided by an IVR system to a communication device 102a in a call-on-hold duration, in accordance with still another embodiment of the invention. The display screen 602 of the user includes information corresponding to the dialed number 604. In an embodiment, the dialed number 604 corresponds to the destination's IVR system. Further, the display screen 602 includes a visual window 606. In an embodiment, the visual window 606 includes an area 608 that enables the user to attach documents to be submitted to the IVR system. Furthermore, the display screen 602 includes an area 610 that provides information corresponding to the amount of time the call will remain on-hold. Additionally, the visual window 606 may include such information (not shown) that may require the user's input. In such a case, the user may provide input by using a keypad 612 of the communication device.

In an embodiment, a user may dial a phone number 604 corresponding to a destination for applying for an insurance policy. The process may require the user to navigate to various stages of the IVR system. While navigating through various stages of the IVR system, the IVR system may put the call of the user on-hold. At the hold time, in an exemplary instance, the IVR system may send details of the forms or documents that are required to be submitted by the user in order to complete the process. In an embodiment, the IVR system may demand for certain documents for security or user authentication purposes. Further, the process may allow the user to utilize the time on-hold by either filling the necessary documents out or by submitting the required documents to the system so that when the customer executive activates the call then he/she should have all the documents required in the procedure.

In addition, the visual window 606 of the display screen 602 includes a command button 608 that may allow the user of the communication device to submit documents to the IVR system during the on-hold call. In an embodiment, the communication device may use VOIP to call the IVR system. The command button 608 may redirect the user to a window that may allow the user to attach one or more files. In an embodiment, the user may be re-directed to a webpage. The user may attach a number of documents in the window. The documents may be sent to the IVR database in real-time during the on-hold call. In an embodiment, the visual window may prompt for inputs from the user to fill the required forms and may store the responses to create the required forms.

FIG. 7 illustrates an exemplary service provided by an IVR system to a communication device 102a in a call-on-hold duration, in accordance with another embodiment of the invention. The display screen 702 of the user includes information corresponding to the dialed number 704. In an embodiment, the dialed number 704 corresponds to the destination's IVR system. Further, the display screen 702 includes a visual window 706. In an embodiment, the visual window 706 may display user-specific information to the user of the communication device. Moreover, the user-specific information may be received by the communication device 102a from the IVR system.

Further, the visual window 706 includes two hyperlinks 708 and 710. Link 708 may enable the user of the communication device to navigate to previous information provided by the IVR system. Moreover, Link 710 may enable the user of the communication system to navigate to the next available information. Furthermore, the display screen 702 includes an area 712 that provides information corresponding to the amount of time the call will remain on-hold. Additionally, the visual window 706 may include information (not shown) that may require the user's input. In such a case, the user may provide input by using a keypad 714 of the communication device.

In an embodiment, a user may dial a phone number 704 corresponding to a destination for inquiries corresponding to an insurance policy. The process may require the user to navigate through various stages of the IVR system. While the user navigates through various stages of the IVR system, the IVR system may put the call on-hold for some reason. At the hold time, in an exemplary instance, the IVR system may provide the user with some information corresponding to the insurance and about the policy. The IVR system may send only a specific piece of information that may be of interest to the user, determined by the user's profile stored with the IVR system. Further, the specific piece of information may be selected from a website based on the IVR option selected by the user. The system may also provide the user a link to a portion of data present on a webpage that may be of interest to the user. Further, the system may make a list of all such data that is mostly queried by the users of the system and may utilize the list to update the other users of the IVR system.

FIG. 8 illustrates an exemplary service provided by an IVR system to a communication device 102*a* in a call-on-hold duration, in accordance with still another embodiment of the invention. The display screen 802 of the user includes information corresponding to the dialed number 804. In an embodiment, the dialed number 804 corresponds to the destination's IVR system. Further, the display screen 802 includes a visual window 806. In an embodiment, the visual window 806 may display user-specific information to the user of the communication device. Moreover, the user-specific information may be received by the communication device 102*a* from the IVR system. Further, the display screen 802 includes an area 808 that provides information corresponding to the amount of time the call will remain on-hold. Additionally, the visual window 806 may include such information (not shown) that may require the user's input. In such a case, the user may provide input by using a keypad 810 of the communication device.

In an embodiment, a user may dial a phone number 804 corresponding to a destination for taking a coaching lesson. The process may require the user to navigate through various options of the IVR system. While navigating through various options of the IVR system, the IVR system may put the call of the user on-hold for some reason. At the hold time, in an exemplary instance, the IVR system may provide the user with some videos corresponding to the coaching lesson required by the user. In an embodiment, the user may either download or stream a video from the database of the IVR system. In another embodiment, the IVR system may enable the user to watch an online video specific to the coaching lesson, as required by the user during the on-hold call period. The IVR system may send only a specific video with specific information that may be of interest of the user.

FIG. 9 illustrates a flow diagram of a method for implementing IVR services for an on-hold caller, in accordance with an embodiment of the invention. At step 902, a caller dials a number of a service provider and the service provider receives the call of the caller. Further, at step 904, the service provider enables an IVR system to attend to the caller. Thereafter, the IVR system attends to the caller (hereinafter, referred to as 'user') in a pre-set manner. Furthermore, at step 906, the IVR system may communicate with the user through audible means or through visual means or through a combination thereof. The IVR menu may then enable the user to navigate through various options provided by the service provider. The user may then navigate to an interested option and may request more details corresponding to the interested option.

At step 908, the IVR system may redirect the call to a customer care executive to better handle the queries of the user. In an embodiment, the user may be asked to remain on hold until any one of a customer care executives attends to the user. In another embodiment, the user might be asked to remain on hold for any other purpose. It may be appreciated by a person skilled in the art that the reason for which the user is required to remain on hold is not meant to be a limiting factor for the scope of the invention.

At step 910, the IVR system may provide the user with information corresponding to the amount of time the user is required to remain on hold or is required to wait for some other event. In an embodiment, the user may have a visual window displayed on his/her communication device to convey the amount of time required to hold the call. Further at step 912, the IVR system may provide the user with one or more services that are customized according to the needs or interest of the user. The IVR system may judge the need or the interest of the user by various means. Various means may include, but are not restricted to, choice of the IVR option made by the user, previous activities of the user with the system, registration data filled by the user, and third-party sources.

Further, the customized services may include, but are not restricted to, customized advertisements, specific information, specific instructions, specific requests etc. The customized advertisements may be customized based on the choice of an IVR option by the user for which the user is placed on hold. In an embodiment, the advertisements may be provided by the IVR service provider. In another embodiment, the advertisements may be provided by competitors of the IVR service provider. In yet another embodiment, the advertisements may be provided by any third-party.

Furthermore, specific information may be selected by the IVR service provider by the choice of the option made by the user in the IVR system or by the previous activities of the user in the IVR system. The IVR system may interpret the purpose of the user to select a particular IVR option and may provide the user with the necessary information corresponding to the selected IVR option. The necessary information may be in the form of textual data, audio, video, graphics, or a website link.

Again further, specific instructions may be selected by the IVR service provider by the choice of the option made by the user in the IVR system or by the previous activities of the user in the IVR system. The IVR system may therefore guide the user by providing necessary instructions required to be followed by the user for a particular service. The specific instructions may enable the user to correctly follow the procedure required for enjoying a particular service provided by the service provider of the IVR system. Similarly, the specific requests may be made to the user if required by the IVR system. The specific request may be a request to submit a particular document. In an embodiment, the customized services will be provided to the user during the on-hold call. The customized services may be displayed to the user in a visual window on the communication device of the user. The IVR system may also enable the user to provide inputs to the IVR system. In an embodiment, VOIP may be used to support the data transfer between the service provider and the user during a call.

At step 914, the IVR system may maintain the communication with the user and may continue the services for the user until the user disconnects the call. Moreover, the IVR system may continue the services for the user until the hold time for the call is over or the call is activated by a customer executive. Further, the IVR system may store the information corresponding to the services provided to the user and the response of the user to the services. Furthermore, the IVR system may store the data received by the user, if any. The data may include documents submitted by the user or forms filled by the user or more.

FIG. 10 illustrates a flow diagram of a method for alerting an on-hold caller concerning activation of the on-hold call, in accordance with an embodiment of the invention. At step 1002, a caller dials a number of a service provider and the service provider receives the call of the caller. Thereafter, the service provider enables an IVR system to attend the caller, at step 1004. In an embodiment, the IVR system attends the caller (hereinafter, referred to as 'user') in a pre-set manner. Furthermore, at step 1006, the IVR system may communicate with the user through audible means or through visual means or through a combination thereof. The IVR menu may then enable the user to navigate through various options provided by the service provider. Therefore, the user may navigate to an interested option and may request to talk to a customer care executive for more details or for complaining about the service.

At step 1008, the IVR system may check if the user has requested to talk to a customer care executive or not. If the user has not requested to talk to the customer care executive, the method may start again from the step 1006. If the user has requested to talk to the customer care executive, the method may move forward to step 1010. At step 1010, the IVR system may put the user on hold in order to connect the call to a customer care executive. The customer care executive may not be available all the time to attend the callers and thereby the user may need to wait for some time for a customer executive to attend the call.

In an exemplary instance, at step 1012, the IVR system may provide the user with an estimated time required by the user to wait for a customer care executive to activate the call for further proceedings. Communication device of the user may be configured to receive and display data from the IVR service provider in a window. In an embodiment, the user and the IVR service provider may be connected through VOIP to enable call and data transmission simultaneously between the service provider and the user. The data transmittable to the user's communication device may include, but is not restricted to, audio, video, website link, textual data or graphical data.

Further, at step 1014, as shown in FIG. 10B, the IVR system or the communication device of the user may be configured to allow the user to initiate/activate an alert that may alarm the user on activation of the call from hold status. In an embodiment, the alarm may be an audio alarm, or vibration alert, or screen flashing alarm or so forth. The alarm may enable the user to divert his/her attention from the communication device to some other work. On the activation of the alarm, the user may be alerted that the call is not on hold and the user can talk to the customer care executive.

At step 1016, the IVR system may check if the user has activated the alert or not. If the alert has not been activated then the method may proceed to step 1026, otherwise the method may proceed to step 1018. At step 1018, the IVR system may provide customized advertisements to the user and may continue advertizing until the call is activated by a customer executive of the IVR system. Further, at step 1020, the IVR system may check if the call is activated by a customer executive or not. In this case, if the call has not been activated by a customer executive then the method may start again from the step 1018. Otherwise, if the call has been activated by a customer executive then the method may proceed to the step 1022.

At step 1022, the IVR system may trigger the communication device to initiate the alert corresponding to activation of the call. The communication device may then alarm the user through pre-set means. The user may then talk to the customer care executive and may follow further proceedings. In an embodiment, the customer care executive may again place the call of the user on hold and the method may start over again from step 1010. Further, at step 1024, the IVR system may maintain the call connection with the user until the user disconnects the call or if the procedure ends.

At step 1026, as shown in FIG. 10C, the IVR system may analyze the recent IVR option navigated by the user, may analyze the capabilities of the communication device used by the user, and may analyze the time duration for which the user is required to hold the call. Based on the above information, the IVR system may decide a suitable service to be provided to the user. The service may include advertisements, information corresponding to the selected IVR option, instructions corresponding to the selected IVR option or more. Additionally, the IVR system may provide information to the user corresponding to the amount of time the user needs to wait on hold.

At step 1028, the IVR system may enable the communication device to receive the determined service. In an embodiment, the user may receive more than one type of service from the IVR system, depending upon the duration on which the user needs to wait. Further, at step 1030, the IVR system may maintain various services to the user on hold until the time the call is activated by the customer care executive. At step 1032, the IVR system may check if the call has been activated or not. If the call has been activated then the method may proceed to step 1034. Otherwise, the method may start over again from step 1030. At step 1034, the IVR system may maintain the call connection with the user until the user disconnects the call or if the procedure ends.

FIG. 11 illustrates a flow diagram of a method for detecting status of a telephone call to provide suitable services to its caller, in accordance with an embodiment of the invention. At step 1102, a user of a telephone device, such as device 104*a*, initiates a call to a destination. In an embodiment, the destination can be any general telephone device or can be a telephone device enabled with IVR system. The user may require contact number of the destination in order to establish a contact with the destination. The contact number of the destination may be stored as identity of the destination by the device. Thereafter, the user may connect and communicate with the destination.

At step 1104, the device may monitor the data being transferred and received from the destination in order to track and store any registration data or any other input provided by the user to the destination. In an embodiment, the user may select various keys of the device to navigate deep into an IVR system. The device may monitor such inputs provided to the destination to track activities of the user with various destinations. Further, the device may also monitor any output received from the destination corresponding to the input provided by the user to analyze interest of the user with the connected destination.

At step 1106, the device stores the interaction recorded with the destination in a profile of the user. The profile of the user may include, but is not restricted to, personal information of the user, business information of the user, and interaction recorded with one or more destinations. The device may use the information stored in the profile of the user to ease the user by prompting required data at various steps of interaction with a destination. In an embodiment, the required data may be selected by the device based on the previous interactions stored by the device with a particular destination. Further, in an embodiment, the profile of the user may be stored within the database of the device, or may be stored remotely in a depository that is connected with the device via a network.

At step 1108, the device may perform a check to determine the status of the telephone call that is connected between the device and the destination. The status of the call may either be active or may be on-hold. In an embodiment, the device may determine the status of the call by detecting a designated tone that is usually played whenever a call goes on-hold. The device may be configured to detect such type of designated tones to confirm whether the call is active or on-hold.

In another embodiment, the device may determine the status of the call by detecting a background music playing during the call that is usually played whenever a call is switched to hold state. The device may be configured to detect any of such music to determine if the call is on hold or not. For example, if the device monitors its interaction with a destination and detects a playing of music, then the device may infer if the call is on hold state. In an embodiment, the user may be provided with an option to select a desired background music that may be played whenever the user goes on-hold.

In yet another embodiment, the device may determine the status of the call by detecting if there is any interaction between the user and the destination or not. In an embodiment, the interaction may either be in textual form, or in audio form. If the device detects no interaction between the user and the destination, then the device may monitor if there the 'no interaction' continues for a pre-set interval of time period. If even after the pre-set interval of time period the device could not detect any interaction or conversation, then the device may infer that the call is on hold status.

At step 1110, the device decides if the telephone call is on-hold or not. In case, if the device determines that the call is not on hold, then the device may allow the user to continue with the conversation or interaction with the destination and the method may repeat itself again from the step 1108, until the device detects that the call is at hold status. Further, if the device detects that the call is at hold status, then the method may step forward to step 1112.

At step 1112, the device may analyze user's profile that is stored within its database to determine commercial/non-commercial interests of the user. Additionally, the device may analyze the inputs provided by the user to the destination to determine the purpose of the user to communicate with the destination. Therefore, based on the analysis of the profile of the user and purpose of the user to call a destination, the device may either provide or may receive user specific services.

In an embodiment, the user specific services may include, but are not limited to, advertisements tailored specifically according to needs of the user, information corresponding to the connected destination, facts and figures for the services provided by the connected destination, official or social network web page of the destination, such as, LinkedIn page of the destination and so forth. In addition, the device may display to the user, recent news corresponding to the destination and recent email exchange with the connected destination.

Further, in the embodiment, the services provided to the user may be provided by one or more entities. The entities may include, but are not restricted to, the device itself, the connected destination, the network service provider of the user, or any third party connected with the device directly or indirectly. In an embodiment, the services may be provided by the network service provider of the user or of the destination. The network service provider may sell the time duration for which a user remain on hold, along with the information depicting the purpose of the user to stay on hold, to interested entities. The interested entities may include, but not limited to, the connected destination itself, market competitors of the destination, and so forth.

At step 1114, the device may re-perform a check to determine the status of the cal, i.e. whether the call is active or is on-hold. The device may again rely on the analysis of background music, designated tone, or of no conversation for a preset time period. Based on the analysis, the device may determine if the call is still on the hold status or is retrieved to active state. In case, if the call is determined to be in active state, then the method may step forward to step 1120, otherwise the method may step forward to step 1116.

At step 1116, i.e. when the call is determined to be still at hold stage, the device may provide the user with an interactive window. The interactive window may enable the user to provide direct inputs corresponding to the services being received on display of the device. The inputs may be received by the service provider, and at step 1118, the service provider may analyze the inputs in order to tailor the services being provided to the user, specific to user's requirements. Thereafter, the method may start over again from step 1112, where the user receives the service that is specifically tailored according to requirements of the user. The process of tailoring of services according to the inputs received from the user may continue endlessly until the call gets disconnected, or the device detects the call to be activated at step 1114.

Thereafter, at step 1120, the device may ring an alarm to inform the user on the event of call activation. The device may alarm the user by one or more of a process of audio notification, visual notification by flashing a visual pattern or by glow of a LED, or by vibration alerts. The alarm may be triggered to notify the user in case, where the user is not attentive towards his/her device. In an embodiment, the device may detect position of eyes of the user to determine if the user is required to be alarmed or not.

Moreover, after retrieval of the call, the device may allow the user and the representative of the connected destination to communicate, and meanwhile, at step 1122, the device updates the profile of the user by storing the various inputs and outputs received by the device in the aforementioned method steps. Further, the device may update the profile of the user with such data that may help the device to recommend the user with more relevant and tailored services, as per the interest of the user.

Further, the method is not restricted to the above information as mentioned herein. The various embodiments that are explained in FIGS. 3-8 may be utilized by each of the methods as explained here above. Further, the invention is not limited to the above-mentioned embodiments and examples and many other embodiments and examples may be implemented in light of the invention without departing from the scope of the invention.

Further, it may be appreciated by a person skilled in the art that the device, system and method, corresponding to the present invention, provide enhance telephonic calling to a user through various features and functionalities as described previously. These functionalities and features of the present invention are not restricted to the above mentioned description. Various embodiments (not restricted to the above description) may be implemented in light of the scope of the present invention.

Advantageously, the present invention provides a system, a method and a device to enhance telephone calling between a communication device of a user and an IVR destination when call is on hold. The present invention enables creating and maintaining a profile of a user based on interaction of the user with an IVR system corresponding to the destination. The present invention detects when the call is put on hold by the destination so as to enable the user to perform one or more actions during that time. Based on the profile and interaction of the user with IVR system (corresponding to IVR destination), the user may be provided with various services to suit the interests of the user. The services provided to the user include, but are not restricted to, tailored advertisements, information, instructions, and requests etc. Moreover, the services provided may allow the user to perform one or more actions, such as providing inputs to the IVR destination. Furthermore, the IVR system notifies the user corresponding to the amount of time left to wait on hold. Again further, the IVR system enables the user to activate an alarm in his/her communication system that may alert the user on activation of the call.

Additionally, when the call is on hold, the present invention may enable the destination to provide information, such as one or more services and available offers, to the user based on the interest of the user. Thus, the present invention facilitates the user and service providers (corresponding to the destination) to utilize the hold time effectively. Also, based on the above, it can be concluded that the present invention makes the call more interactive and more informational for the user.

It may be appreciated by a person skilled in the art that the invention is not limited to the advantages as mentioned here above. Further, many other advantages may be understood in light of the description given above without departing from the scope of the invention. Embodiments of the invention are described above with reference to block diagrams and schematic illustrations of methods and systems according to embodiments of the invention. It may be understood that each block of the diagrams and combinations of blocks in the diagrams can be implemented by computer program instructions. These computer program instructions may be loaded onto one or more general purpose computers, special purpose computers, or other programmable data processing translators to produce machines, such that the instructions that execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what are presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A device comprising:
a processor, a memory, connection to the device keying, connection to display, connection to the Internet and connection to the device audio channel, wherein said memory comprises instructions executable by the processor to perform the following:
   (i) monitoring the keying device for keying a call to an Interactive Voice Response ("IVR") destination and registration the IVR destination keyed numbers including keyed choices for internal destination made once a telephone connection was established;
   (ii) detecting the call was put on-hold comprising: detecting a designated tone, or detecting background music, or detecting more than pre-defined seconds of no conversation;
   (iii) use said connection to the Internet to get information related to said internal destination; and
   (iv) send actionable content to said display wherein said actionable content comprises: (a) form for caller data for said IVR destination,
      (b) schedule book to set up future appointment with said destination representative;
wherein said device is a user calling device.

2. The device according to claim 1 wherein said get information comprise getting the information from one of the following:
   (i) a site associated with said IVR destination; or
   (ii) a third party depository connected to the Internet.

3. The device according to claim 1 comprising: instruction executable by the processor to send visual data to said display wherein said visual data comprises
   recent email received from said IVR destination.

4. The device according to claim 1 comprising: instruction executable by the processor to send actionable content to said display wherein said actionable content comprises:
   form for caller data for said IVR destination.

5. The device according to claim 1 comprising: instruction executable by the processor to monitor said audio channel and to initiate an alarm comprising:
   (i) Communicating flashing visual pattern, or
   (ii) Communicating vibration request to said calling device.

6. The device according to claim 1, comprising: instruction executable by the processor to send estimated hold time to said display.

7. A system comprising:
a processor; connection to the internet, and
a memory coupled to the processor, the memory comprising instructions executable by the processor to:
send information, over the Internet to a caller, regarding an Interactive Voice Response ("IVR") internal destination, wherein
said send information is associated with an 'on-hold' of an on going voice communication between said caller and said IVR; and
send actionable content to said display wherein said actionable content comprises: (i) form for caller data for said IVR destination, or
(ii) schedule book to set up future appointment with said IVR destination representative.

8. A The system according to claim 7, wherein said
send information is in response to said caller request and wherein said caller request comprise the identity of said IVR.

9. The system according to claim 7, wherein said send information is in a response to said IVR request and wherein said IVR request comprise the identity of said caller.

10. The system according to claim 7, wherein said information comprises:
(i) content of a web site related to said IVR, or
(iii) data regarding services provided by said IVR.

11. The system according to claim 7, wherein said information comprises:
schedule book to set up future appointment with said IVR representative.

12. The system according to claim 7,
wherein said information comprises alternative destination to said IVR.

13. The system according to claim 8, wherein said information comprises estimated hold time.

14. A method to enhance telephone calling comprising:
(i) monitoring telephone call between a caller and an Interactive Voice Response ("IVR") destination;
(ii) registration of caller initiated tone coded choices;
(iii) detecting having the call been put on-hold comprising: detecting a designated tone, or detecting background music, or detecting more than pre-defined seconds of no conversation,
(iv) transferring information over the internet to said caller; and
(v) monitor said telephone call and to initiate an alarm comprising:
(a) sending flashing request, or
(b) sending vibration request.

15. A The method according to claim 14, wherein said information is been fetch from an IVR destination-database.

16. The method according to claim 14, wherein said information comprises:
(i) content of a web site related to said IVR destination, or
(iii) data regarding services provided by alternative provider to said IVR destination.

17. The method according to claim 14, wherein said information comprises:
(i) form for caller data for said IVR destination, or
(iii) schedule book to set up future appointment with said IVR destination representative.

18. The method according to claim 14, comprising monitor said telephone call and to initiate an alarm comprising:
sending vibration request.

19. The method according to claim 14, wherein said telephone call is a voice over IP call.

20. The method according to claim 14, wherein said information relates to prior communication between said caller and said IVR destination.

* * * * *